US012179685B2

(12) United States Patent
Ohno et al.

(10) Patent No.: US 12,179,685 B2
(45) Date of Patent: Dec. 31, 2024

(54) AIRBAG DEVICE AND PASSENGER PROTECTING DEVICE

(71) Applicant: TOYOTA JIDOSHA KABUSHIKI KAISHA, Toyota Aichi-ken (JP)

(72) Inventors: Mitsuyoshi Ohno, Miyoshi Aichi-ken (JP); Takeshi Yamamoto, Toki Gifu-ken (JP); Toshiki Iwama, Toyota Aichi-ken (JP); Yoshito Kusuhara, Ichinomiya Aichi-ken (JP); Tsutomu Ishii, Ichinomiya Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/378,715

(22) Filed: Oct. 11, 2023

(65) Prior Publication Data
US 2024/0123937 A1    Apr. 18, 2024

(30) Foreign Application Priority Data

Oct. 14, 2022    (JP) .................... 2022-165746

(51) Int. Cl.
*B60R 21/207*    (2006.01)
*B60R 21/233*    (2006.01)
(Continued)

(52) U.S. Cl.
CPC ......... *B60R 21/207* (2013.01); *B60R 21/233* (2013.01); *B60R 21/2338* (2013.01); *B60R 2021/0004* (2013.01); *B60R 2021/2076* (2013.01); *B60R 2021/2078* (2013.01); *B60R 2021/23308* (2013.01); *B60R 2021/23388* (2013.01); *B60R 2021/23509* (2013.01); *B60R 2021/23542* (2013.01)

(58) Field of Classification Search
CPC ................ B60R 2021/23308; B60R 21/233
See application file for complete search history.

(56) References Cited

U.S. PATENT DOCUMENTS 10,246,043 B2 *   4/2019   Schneider ............. B60R 21/235
10,710,539 B2 *   7/2020   Cho ....................... B60R 21/207
(Continued)

FOREIGN PATENT DOCUMENTS

DE           19834061 B4    12/2005
DE       102020207842 A1     3/2021
(Continued)

*Primary Examiner* — Nicole T Verley
(74) *Attorney, Agent, or Firm* — Dinsmore & Shohl LLP

(57) ABSTRACT

An airbag device has an airbag. The airbag has a front-rear chamber and an airbag main body. The front-rear chamber has a left and right pair of front-rear extending portions that pass by respective left and right sides of a head of a passenger seated in a vehicle seat and inflate and deploy toward the seat front side, and a connecting portion connecting front end portions of the pair of front-rear extending portions in a seat left-right direction. The airbag main body inflates and deploys toward a side of the passenger at a seat rear side of the connecting portion, later than the front-rear chamber. At a time when the passenger is restrained, the airbag main body is compressed in a seat front-rear direction while stretching the front-rear chamber in the seat front-rear direction.

20 Claims, 29 Drawing Sheets

(51) Int. Cl.
  *B60R 21/2338*  (2011.01)
  *B60R 21/00*    (2006.01)
  *B60R 21/235*   (2006.01)

(56) References Cited

U.S. PATENT DOCUMENTS

| | | | |
|---|---|---|---|
| 10,870,405 B2* | 12/2020 | Kwon | B60R 21/207 |
| 11,772,592 B2* | 10/2023 | Min | B60R 21/207 |
| | | | 280/743.2 |
| 11,891,008 B1* | 2/2024 | Jaradi | B60R 21/213 |
| 2017/0028955 A1* | 2/2017 | Ohno | B60R 21/233 |
| 2019/0016288 A1* | 1/2019 | Schneider | B60R 21/18 |
| 2019/0016293 A1 | 1/2019 | Saso | |
| 2019/0248322 A1* | 8/2019 | Herzenstiel | B60R 21/207 |
| 2019/0283700 A1* | 9/2019 | Kwon | B60R 21/2338 |
| 2020/0130632 A1* | 4/2020 | Sekizuka | B60R 21/231 |
| 2021/0061211 A1 | 3/2021 | Jung et al. | |
| 2023/0065150 A1* | 3/2023 | Min | B60R 21/233 |

FOREIGN PATENT DOCUMENTS

| | | | | |
|---|---|---|---|---|
| DE | 102023122600 A1 * | 4/2024 | | B60R 21/207 |
| JP | 2017030679 A * | 2/2017 | | |
| JP | 2018086886 A * | 6/2018 | | |
| JP | 2019-018593 A | 2/2019 | | |
| JP | 2019-218013 A | 12/2019 | | |
| JP | 2019-218014 A | 12/2019 | | |
| JP | 2022080416 A * | 5/2022 | | |
| KR | 20230031556 A * | 3/2023 | | |
| WO | WO-2019244767 A1 * | 12/2019 | | |

* cited by examiner

AIRBAG DEVICE AND PASSENGER PROTECTING DEVICE

CROSS-REFERENCE TO RELATED APPLICATION

This application is based on and claims priority under 35 USC 119 from Japanese Patent Application No. 2022-165746 filed on Oct. 14, 2022, the disclosure of which is incorporated by reference herein.

BACKGROUND

Technical Field

The present disclosure relates to an airbag device, and to a passenger protecting device equipped with the airbag device.

Related Art

The airbag device disclosed in Japanese Patent Application Laid-Open (JP-A) No. 2019-018593 has an inflator that generates high-pressure gas at the time of input of an impact, and a bag body that receives a supply of gas from the inflator and inflates and deploys from the seatback of a vehicle seat. The bag body has a torso supporting portion that deploys at the side opposite the seatback so as to sandwich the torso of the passenger seated in the vehicle seat therebetween, and a pair of head supporting portions that are connected to the torso supporting portion and respectively deploy at the both sides in the transverse direction of the vehicle seat so as to sandwich the head of the passenger therebetween. A relief portion, which passes-through in the vertical direction between the pair of head supporting portions in the deployed state and into which the head of the passenger escapes, is formed at the bag body.

The airbag device disclosed in JP-A No. 2019-218013 has an inflator, and an airbag that deploys due to gas supplied from the inflator. The airbag has a rear inflating portion that deploys at the back surface side of a seat, a pair of side inflating portions that extend toward the front from the seat transverse direction both sides of the rear inflating portion, and a pair of front inflating portions that extend from the pair of side inflating portions toward the central side and are connected together at the center and cover the front of the passenger. In this airbag, a gas flow path is formed in the order of the rear inflating portion, the side inflating portions and the front inflating portions. The front inflating portions have a pair of restraining portions extending from the pair of side inflating portions toward the central side and connected together at the center and covering the front side of the passenger, and a pair of energy absorbing portions extending from the pair of restraining portions toward the front and toward the left and right outer sides respectively and covering the front surfaces of the restraining portions.

SUMMARY

In the airbag device disclosed in JP-A No. 2019-018593, at the time when the passenger is restrained by the bag body, tensile load in the vehicle front-rear direction is applied to the torso supporting portion and the pair of head supporting portions. Similarly, in the airbag device disclosed in JP-A No. 2019-218013, at the time when the passenger is restrained by the airbag, tensile load in the vehicle front-rear direction is applied to the pair of side inflating portions and the pair of front inflating portions. Because such tensile load increases greatly from the initial stage of restraining through the latter stage of restraining, the load applied to the passenger increases significantly. Therefore, there is room for improvement from the standpoint of improving the energy absorbing performance of the airbag.

In view of the above-described circumstances, an object of the present disclosure is to provide an airbag device and a passenger protecting device that can improve the energy absorbing performance of an airbag that inflates and deploys from the seat rear side of the upper portion of a vehicle seat toward the seat front side.

An airbag device of a first aspect of the present disclosure includes an inflator configured to generate gas at a time of a collision of a vehicle, and an airbag to which the gas is supplied, and that is configured to inflate and deploy from a seat rear side of an upper portion of a vehicle seat toward a seat front side, wherein the airbag has a front-rear chamber having a left and right pair of front-rear extending portions that pass by respective left and right sides of a head of a passenger seated in the vehicle seat and inflate and deploy toward the seat front side, and a connecting portion connecting front end portions of the pair of front-rear extending portions in a seat left-right direction, and an airbag main body that inflates and deploys toward a side of the passenger at a seat rear side of the connecting portion later than the front-rear chamber, and that, at a time when the passenger is restrained, is compressed in a seat front-rear direction while stretching the front-rear chamber in the seat front-rear direction.

In the airbag device of the first aspect, at a time of a collision of the vehicle, gas generated from the inflator is supplied to the airbag, and the airbag inflates and deploys from the seat rear side of the upper portion of the vehicle seat toward the seat front side. The airbag has the front-rear chamber and the airbag main body. The front-rear chamber has the left and right pair of front-rear extending portions that pass by respective left and right sides of the head of the passenger seated in the vehicle seat and inflate and deploy toward the seat front side, and the connecting portion connecting the front end portions of the pair of front-rear extending portions in the seat left-right direction. The airbag main body inflates and deploys toward a side of the passenger at the seat rear side of the connecting portion, later than the front-rear chamber. At the time when the passenger is restrained, the airbag main body is compressed in the seat front-rear direction while stretching the front-rear chamber in the seat front-rear direction. Due to this compressive deformation of the airbag main body, the energy absorbing performance can be improved.

In an airbag device of a second aspect, in the first aspect, gas from the inflator is supplied to the airbag main body via a communication hole positioned at seat rear side of a seat left-right direction central portion of the connecting portion in an inflated and deployed state of the front-rear chamber.

In the airbag device of the second aspect, gas from the inflator is supplied to the airbag main body via the communication hole that is positioned at the seat rear side of the seat left-right direction central portion of the connecting portion of the front-rear chamber in the inflated and deployed state of the front-rear chamber. Namely, the gas, which has passed-through the pair of front-rear extending portions and the connecting portion of the front-rear chamber, is supplied from the above-described communication hole toward the seat rear side into the airbag main body. Due thereto, the airbag main body can be inflated and deployed sufficiently later than the front-rear chamber. As a result, for example, it is easy to cause the airbag to pass through the narrow gap between the head of the passenger and the ceiling of the vehicle, and to inflate and deploy the airbag.

In an airbag device of a third aspect, in the first aspect or the second aspect, a base fabric that structures the front-rear chamber includes a base fabric that is harder to stretch than a base fabric that structures the airbag main body.

In the airbag device of the third aspect, the base fabric that structures the front-rear chamber includes a base fabric that is harder to stretch than the base fabric that structures the airbag main body. Therefore, the amount of energy absorbed by the stretching of the front-rear chamber in the seat front-rear direction can be improved.

In an airbag device of a fourth aspect, in the third aspect, the front-rear chamber is a structure in which plural base fabrics are superposed and sewn together, and one or more of the plural base fabrics are the base fabric that is harder to stretch.

In accordance with the airbag device of the fourth aspect, at the time of manufacturing the front-rear chamber, plural base fabrics are superposed and sewn together. One or more of the plural base fabrics are the base fabric that is harder to stretch than the base fabric that structures the airbag main body. Therefore, the effects of the third aspect are obtained.

In an airbag device of a fifth aspect, in any one of the first aspect through the fourth aspect, a shape of the airbag main body is configured such that the airbag main body is sandwiched in between thighs and chest of the passenger at a time of restraining.

In accordance with the airbag device of the fifth aspect, the airbag main body is sandwiched between the thighs and the chest of the passenger at the time when the passenger is restrained by the airbag. Due thereto, the upper body of the passenger can be made to contact the airbag main body over a large surface area, and therefore, the load to the passenger can be reduced well.

In an airbag device of a sixth aspect, the airbag device of any one of the first aspect through the fifth aspect includes a left and right pair of rear tethers having respective one end portions that are attached to the pair of front-rear extending portions, and having respective other end portions that are attached to a seatback of the vehicle seat or to a vehicle body further toward a seat rear side than the passenger, and that, at the time of restraining, pull the pair of front-rear extending portions in toward seat obliquely rearward and downward sides.

In accordance with the airbag device of the sixth aspect, the left and right pair of rear tethers, whose respective one end portions are attached to the pair of front-rear extending portions of the front-rear chamber, and whose respective other end portions are attached to the seatback of the vehicle seat or to the vehicle body further toward the seat rear side than the passenger, pull the pair of front-rear extending portions in toward seat obliquely rearward and downward sides at a time when the passenger is restrained by the airbag. The pair of rear tethers, together with the front-rear chamber, receive and support the load that is applied from the passenger to the airbag main body. Further, due to the above-described pulling-in by the pair of rear tethers, swinging of the airbag in the seat vertical direction and the seat front-rear direction at the time of completion of inflation and deployment can be suppressed.

In an airbag device of a seventh aspect, in the sixth aspect, lower surfaces of the pair of front-rear extending portions are structured so as to abut left and right shoulders of the passenger at a time of restraining.

In accordance with the airbag device of the seventh aspect, due to the pair of front-rear extending portions of the front-rear chamber being pulled-in toward seat obliquely rearward and downward sides by the pair of rear tethers at the time when the passenger is restrained by the airbag, the lower surfaces of the pair of front-rear extending portions abut the left and right shoulders of the passenger. Due thereto, the seat vertical direction position of the airbag main body with respect to the head of the passenger can be stabilized, regardless of differences in physiques of passengers.

In an airbag device of an eighth aspect, in the sixth aspect, the vehicle seat is a bench seat, a left and right pair of slits, which extend in a seat vertical direction at respective seat left-right direction sides of the passenger, are formed in a seatback of the bench seat, and, in a state before inflation and deployment of the airbag, portions of the respective rear tethers are inserted through the respective slits.

In accordance with the airbag device of the eighth aspect, the left and right pair of slits, which extend in the seat vertical direction at the respective seat left-right direction sides of the passenger, are formed in the seatback of a bench seat. In a state before inflation and deployment of the airbag, portions of the pair of rear tethers are inserted through the respective slits. At the time of inflation and deployment of the airbag, these rear tethers deploy toward the seat front side together with the pair of front-rear extending portions of the front-rear chamber. Due to the airbag device being structured in this way, the pair of rear tethers can be provided even in a case in which the vehicle seat is a bench seat.

In an airbag device of a ninth aspect, in the sixth aspect, the vehicle seat is a bench seat, a left and right pair of slits, which extend in a seat vertical direction at respective seat left-right direction sides of the passenger, are formed in a seatback of the bench seat, upper end portions of the respective slits are broad portions at which width dimensions of the slits widen toward a seat upper side, and, at a time of inflation and deployment of the airbag, portions of the respective rear tethers pass through the respective broad portions and are inserted within the respective slits.

In accordance with the airbag device of the ninth aspect, the left and right pair of slits, which extend in the seat vertical direction at the respective seat left-right direction sides of the passenger, are formed in the seatback of a bench seat. The respective upper end portions of the slits are broad portions at which the width dimensions of the slits widen toward the seat upper side. At the time of inflation and deployment of the airbag, the pair of rear tethers deploy toward the seat front side together with the pair of front-rear extending portions of the front-rear chamber. At this time, portions of the respective rear tethers pass through the respective broad portions and are inserted within the respective slits. Because the airbag device is structured in this way, the pair of rear tethers can be provided even in a case in which the vehicle seat is a bench seat.

In an airbag device of a tenth aspect, in the sixth aspect, the vehicle seat is a bench seat, a left and right pair of slits, which extend in a seat vertical direction at respective seat left-right direction sides of the passenger, are formed in a seatback of the bench seat, and respective other end portions of the rear tethers are fixed to a frame of the seatback within the respective slits.

In accordance with the airbag device of the tenth aspect, the left and right pair of slits, which extend in the seat vertical direction at the respective seat left-right direction sides of the passenger, are formed in the seatback of a bench seat. The other end portions of the rear tethers are fixed to the frame of the seatback within the respective slits. At the time of inflation and deployment of the airbag, these rear tethers deploy toward the seat front side together with the pair of front-rear extending portions of the front-rear chamber. Because the airbag device is structured in this way, the pair of rear tethers can be provided even in a case in which the vehicle seat is a bench seat.

In an airbag device of an eleventh aspect, the airbag device of any one of the first aspect through the tenth aspect includes a left and right pair of front upper tethers respectively connecting the pair of front-rear extending portions of the front-rear chamber and upper portions, which inflate and deploy further toward a seat upper side than the front-rear chamber, of the airbag main body.

In accordance with the airbag device of the eleventh aspect, the pair of front-rear extending portions of the front-rear chamber and upper portions, which inflate and deploy further toward the seat upper side than the front-rear chamber, of the airbag main body are respectively connected by the pair of front upper tethers. Due thereto, the airbag main body that has inflated and deployed being inadvertently displaced toward the seat upper side with respect to the front-rear chamber can be suppressed.

In an airbag device of a twelfth aspect, the airbag device of any one of the first aspect through the eleventh aspect includes a left and right pair of front lower tethers respectively connecting the pair of front-rear extending portions of the front-rear chamber and lower portions, which inflate and deploy further toward a seat lower side than the front-rear chamber, of the airbag main body.

In accordance with the airbag device of the twelfth aspect, the pair of front-rear extending portions of the front-rear chamber and lower portions, which inflate and deploy further toward the seat lower side than the front-rear chamber, of the airbag main body are respectively connected by the pair of front lower tethers. Due thereto, the airbag main body that has inflated and deployed being inadvertently displaced toward the seat lower side with respect to the front-rear chamber can be suppressed.

In an airbag device of a thirteenth aspect, in any one of the first aspect through the twelfth aspect, a cleft, into which a head of the passenger can enter at a time of restraining, is formed along a seat vertical direction in a seat left-right direction central portion of a seat rear side surface of the airbag main body that is in an inflated and deployed state.

In accordance with the airbag device of the thirteenth aspect, at the time when the passenger is restrained by the airbag, the head of the passenger enters into the cleft that is formed along the seat vertical direction in the seat left-right direction central portion of the seat rear side surface of the airbag main body. Due thereto, it is easy for the head of the passenger to advance forward, and therefore, it is difficult for rearward bending of the neck of the passenger to occur.

A passenger protecting device of a fourteenth aspect includes a vehicle seat in which a passenger sits, and the airbag device of any one of the first aspect through the thirteenth aspect, which is installed at a seat rear side of an upper portion of the vehicle seat.

In the passenger protecting device of the fourteenth aspect, the airbag device is installed at the seat rear side of the upper portion of a vehicle seat in which a passenger sits. This airbag device is the airbag device of any one of the first aspect through the thirteenth aspect. Therefore, effects that are similar to any one of the first aspect through the thirteenth aspect are obtained.

As described above, in the airbag device and passenger protecting device relating to the present disclosure, the energy absorbing performance of an airbag, which inflates and deploys from the seat rear side of the upper portion of a vehicle seat toward the seat front side, can be improved.

BRIEF DESCRIPTION OF THE DRAWINGS

Exemplary embodiments of the present disclosure will be described in detail based on the following figures, wherein.

DETAILED DESCRIPTION

First Embodiment

Figure 1:
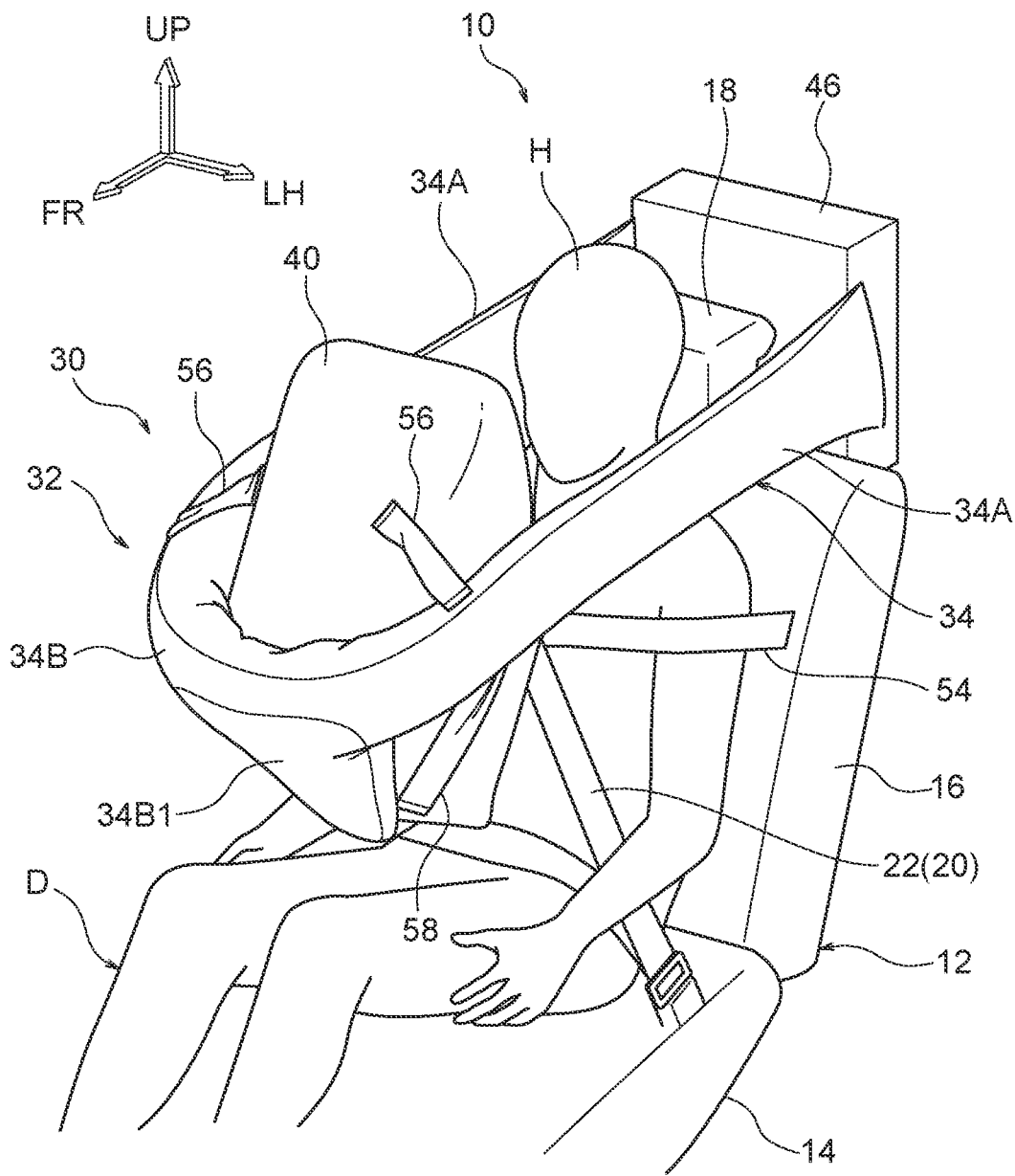
FIG. 1 is a perspective view illustrating a state in which an airbag has inflated and deployed, at a passenger protecting device relating to a first embodiment.
Figure 2:
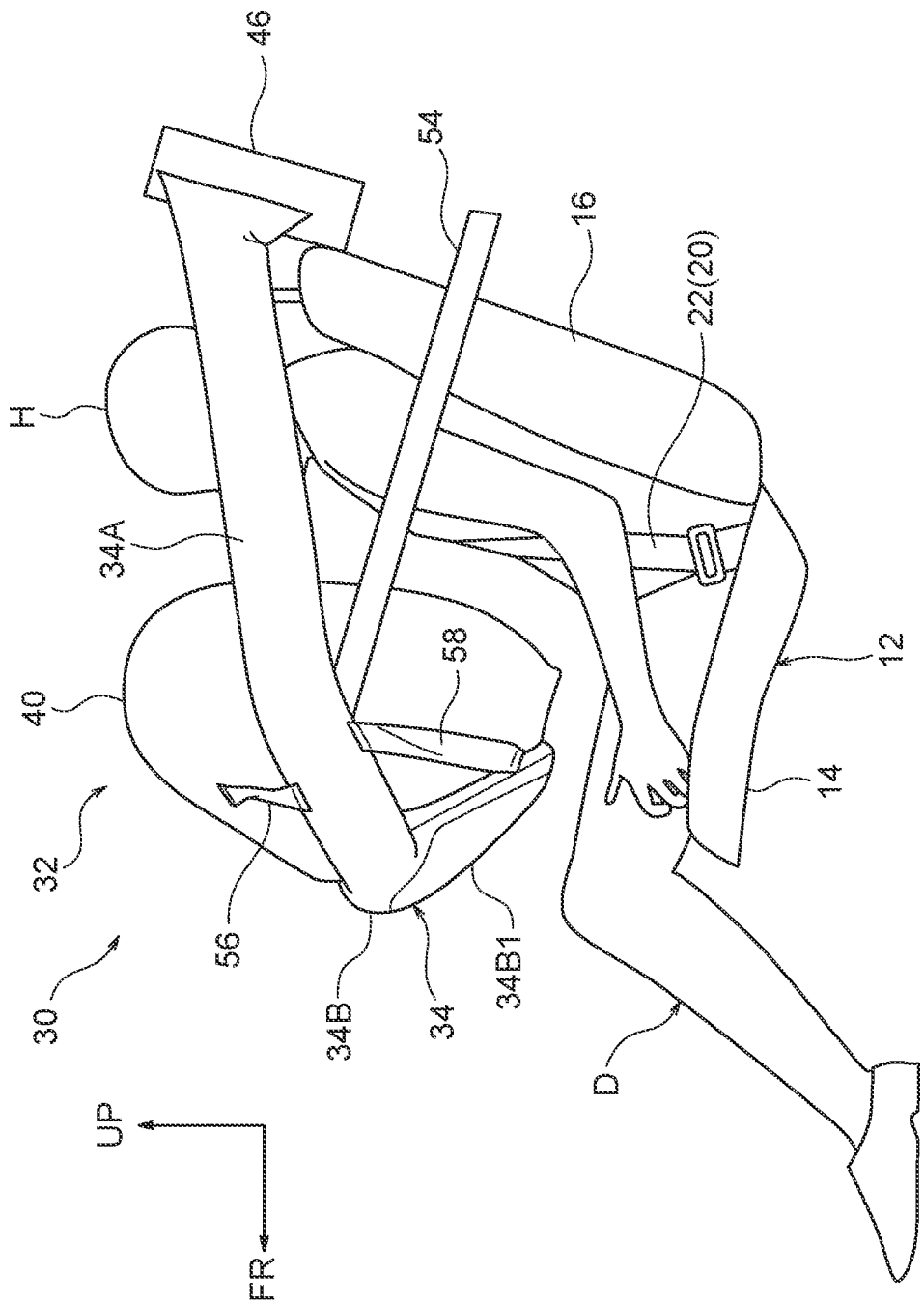
FIG. 2 is a side view illustrating the structures shown in FIG. 1 in a state of being viewed from a vehicle left side.

A passenger protecting device 10 relating to a first embodiment of the present disclosure is described hereinafter with reference to FIG. 1 through FIG. 19. Note that, in the respective drawings, there are cases in which some of the reference numerals are omitted in order to make the drawings easy to understand. Further, arrow FR, arrow UP, arrow LH and arrow RH that are shown appropriately in the respective drawings indicate the forward direction (advancing direction), upward direction, leftward direction and rightward direction of a vehicle, respectively. When description is given hereinafter by using merely front-rear, left-right, and vertical directions, they refer to the front-rear of the vehicle front-rear direction, the left-right of the vehicle left-right direction, and the vertical of the vehicle vertical direction, unless otherwise specified.

As illustrated in FIG. 1 through FIG. 5, the passenger protecting device 10 is structured by a vehicle seat 12 and an airbag device 30. The vehicle seat 12 is a front seat or a rear seat of a vehicle (automobile). The vehicle seat 12 has a seat cushion 14, a seatback 16 provided so as to stand at the upper side of the rear end portion of the seat cushion 14, and a headrest 18 connected to the upper end portion of the seatback 16. The front-rear, left-right, and vertical directions of the vehicle seat 12 coincide with the front-rear, left-right, and vertical directions of the vehicle.

Note that FIG. 1 through FIG. 5 illustrate a state in which a crash test dummy D, which serves as a model of a passenger (a seated person) who is to be protected, is seated on the seat cushion 14 of the vehicle seat 12. The dummy D is, for example, an AM50 (50th percentile U.S. adult male) dummy for a front collision test (Hybrid III). The dummy D is seated in the standard seated posture prescribed by the crash test method, and the vehicle seat 12 is positioned at the standard set position corresponding to that seated posture. Hereinafter, the dummy D will be called □ passenger D□ in order to facilitate understanding.

The passenger D seated on the seat cushion 14 of the vehicle seat 12 is restrained in the vehicle seat 12 by a seatbelt 22 (refer to FIG. 1 through FIG. 3; not illustrated in FIG. 4 and FIG. 5) of a seatbelt device 20. The seatbelt device 20 is a three-point seatbelt device, and is a so-called seat-mounted seatbelt device in which an unillustrated retractor, anchor and buckle (reference numerals omitted) are provided at the vehicle seat 12.

The airbag device 30 has an airbag 32, a pair of inflators 44 (refer to FIG. 6), and a module case 46 (not illustrated in FIG. 8 through FIG. 17). At usual times, the airbag 32 is stored in a folded-up state within the module case 46 together with the pair of inflators 44. The module case 46 is formed in the shape of a rectangular parallelopiped that is hollow. The module case 46 is disposed at the rear of the upper portion of the vehicle seat 12 (specifically, at the rear of the upper end portion of the seatback 16 and the headrest 18), and is fixed to the upper end portion of the seatback 16 or to an unillustrated vehicle body.

The airbag 32 receives the supply of gas from the pair of inflators 44, and inflates and deploys from the rear side of the upper portion of the vehicle seat 12 toward the front side. This airbag 32 has a front-rear chamber 34 and an airbag main body 40. The front-rear chamber 34 has a left and right pair of front-rear extending portions 34A that inflate and deploy past the respective left and right sides of head H of the passenger D toward the front side, and a connecting portion 34B that connects the front end portions of the pair of front-rear extending portions 34A in the left-right direction. The airbag main body 40 inflates and deploys at the rear side of the connecting portion 34B toward the passenger D side (the rear side), later than the front-rear chamber 34.

Figure 6:
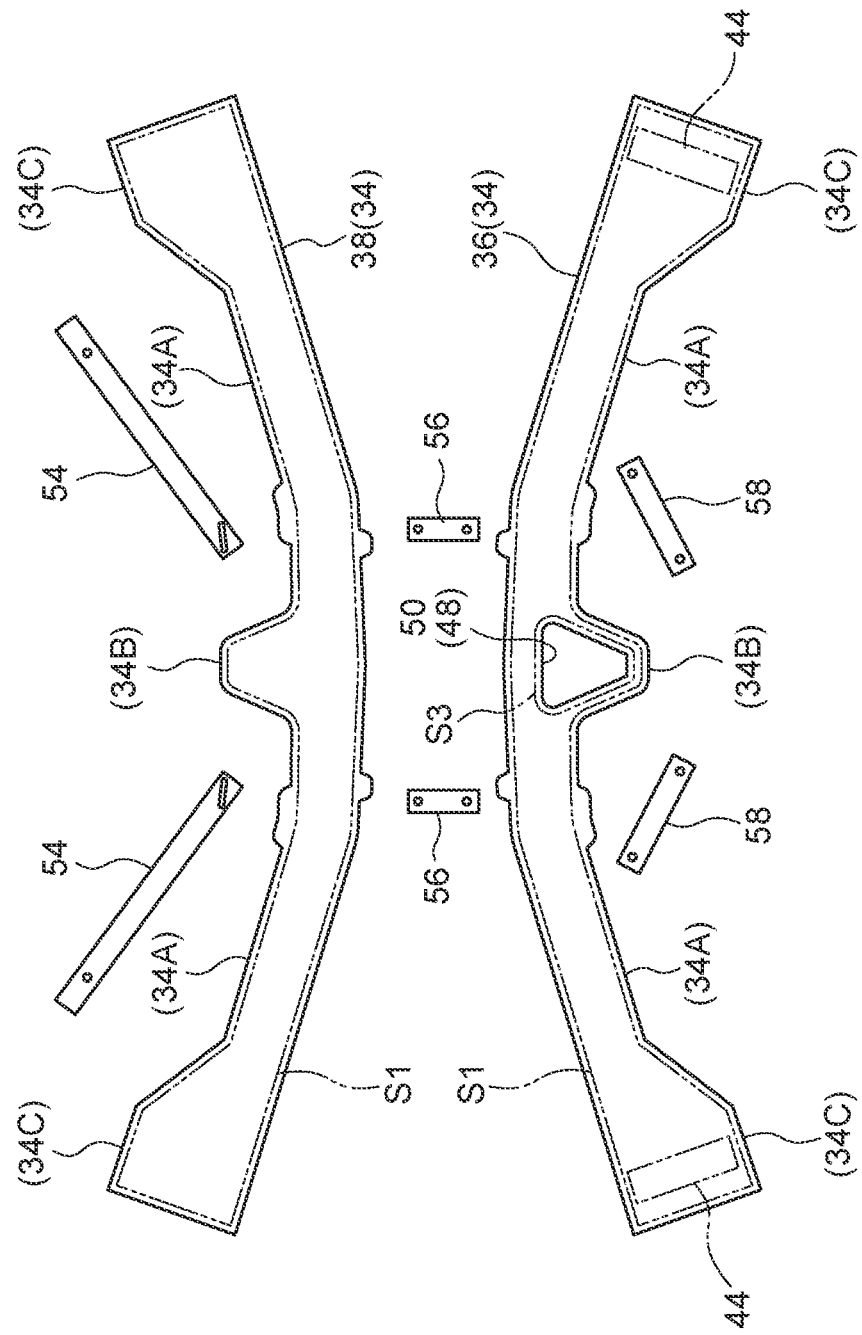
FIG. 6 is a deployed view of a front-rear chamber of the airbag.
Figure 7:
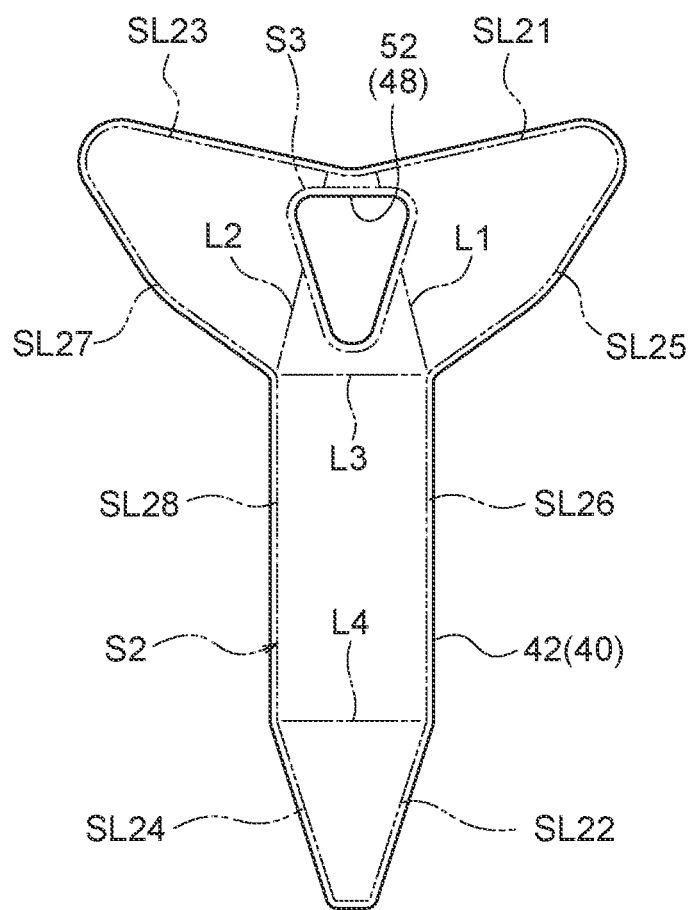
FIG. 7 is a deployed view of an airbag main body of the airbag.
Figure 8:
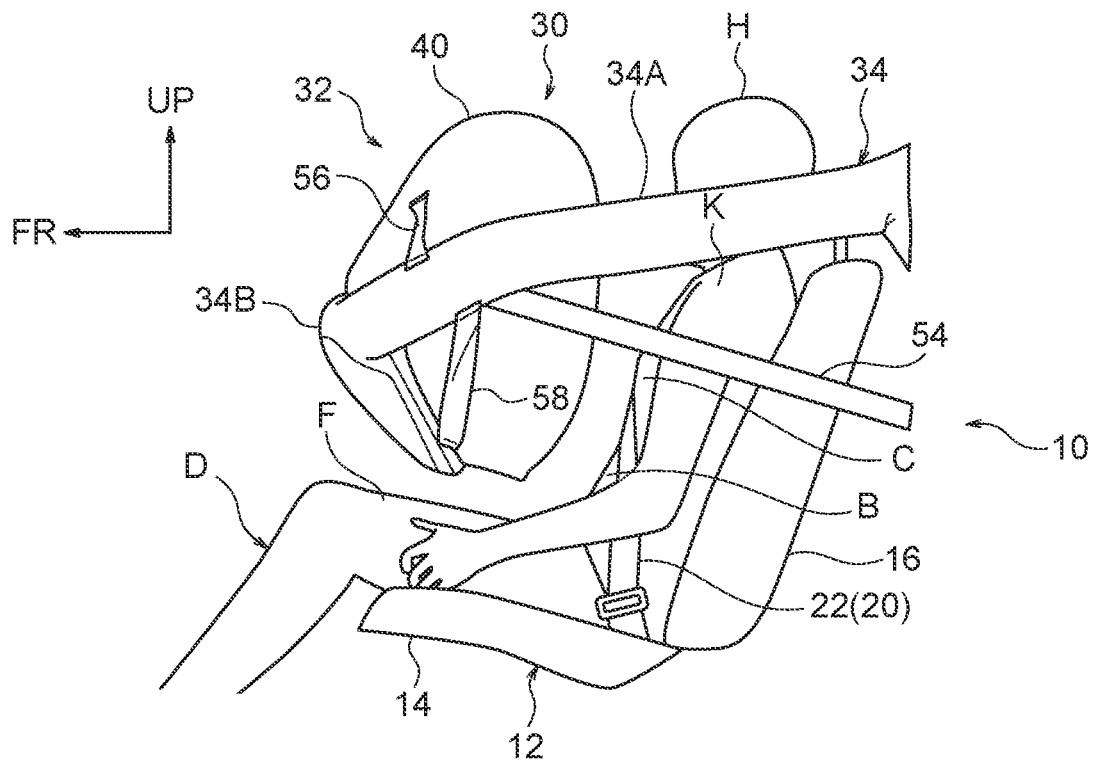
FIG. 8 is a side view illustrating a state immediately after completion of inflation and deployment of the airbag.

The front-rear chamber 34 is formed in the shape of an elongated bag due to two elongated base fabrics 36, 38 that are illustrated in FIG. 6 being superposed and the peripheral edge portions thereof being sewn together at sewn portion S1. The airbag main body 40 is formed in the shape of a bag due to a single base fabric 42 illustrated in FIG. 7 being folded-over along four fold lines L1, L2, L3, L4, and being sewn together at sewn portion S2. At this sewn portion S2, sewing line SL21 and sewing line SL22 are sewn together, sewing line SL23 and sewing line SL24 are sewn together, sewing line SL25 and sewing line SL26 are sewn together, and sewing line SL27 and sewing line SL28 are sewn together. The above-described base fabrics 36, 38, 42 are formed of fabric materials of nylon or polyester for example. One or both of the two base fabrics 36, 38 that structure the front-rear chamber 34 are base fabrics that are harder to stretch than the base fabric 42 that structures the airbag main body 40.

The length direction both end portions of the front-rear chamber 34 are a left and right pair of inflator accommodating portions 34C that accommodate the pair of inflators 44. The length direction central portion of the front-rear chamber 34 is the connecting portion 34B. The portions between the connecting portion 34B and the pair of inflator accommodating portions 34C are the front-rear extending portions 34A respectively. The pair of inflators 44 are combustion or cold gas cylindrical inflators, and generate gas by being operated. Operation of the inflators 44 is controlled by an unillustrated control device, and the inflators 44 are made to generate gas at the time of a collision of the vehicle.

The pair of inflator accommodating portions 34C are disposed within the module case 46 so as to be dispersed at the respective left and right sides. The inflators 44 accommodated within the inflator accommodating portions 34C are disposed in postures in which the axial directions thereof run along the vertical direction of the seatback 16. For example, a pair of upper and lower stud bolts are provided at each inflator 44. The pairs of stud bolts pass-through the inflator accommodating portions 34C, the module case 46, and an unillustrated frame of the seatback 16, and nuts are screwed-together with these stud bolts. Due thereto, the inflator accommodating portions 34C, the inflators 44 and the module case 46 are fixed to the frame of the seatback 16.

The pair of front-rear extending portions 34A are respectively formed in elongated tube shapes. The connecting portion 34B is formed in the shape of a substantially T-shaped bag that communicates with the respective front-rear extending portions 34A. The connecting portion 34B is sewn to the airbag main body 40 at sewn portion S3 (refer to FIG. 6 and FIG. 7) that is provided at the central portion of the connecting portion 34B. As an example, the sewn portion S3 is formed in a substantially upside-down trapezoidal shape. A communication hole 48, which communicates the interior of the connecting portion 34B and the interior of the airbag main body 40, is formed at the inner side of the sewn portion S3. As an example, the communication hole 48 is formed in a substantially upside-down trapezoidal shape. The communication hole 48 is structured by a through-hole 50 formed in the base fabric 36 of the front-rear chamber 34, and a through-hole 52 formed in the base fabric 42 of the airbag main body 40.

At usual times, the pair of front-rear extending portions 34A, the connecting portion 34B and the airbag main body 40 are folded-up by a predetermined way of folding such as rolling-up or corrugating or the like, and are accommodated within the module case 46. When the pair of inflators 44 operate, gas is generated at the interiors of the pair of inflator accommodating portions 34C. The gas generated within the pair of inflator accommodating portions 34C passes-through the pair of front-rear extending portions 34A, and flows to the connecting portion 34B side, and passes-through the communication hole 48 and is supplied to the interior of the airbag main body 40. Due thereto, the airbag 32 inflates and deploys in the order of the pair of front-rear extending portions 34A, the connecting portion 34B and the airbag main body 40. At the time of inflation and deployment of the airbag 32, unillustrated tear lines formed in the module case 46 receive the inflation pressure of the airbag 32 and rupture. Due thereto, the airbag 32 can inflate and deploy toward the outer side of the module case 46.

Figure 3:
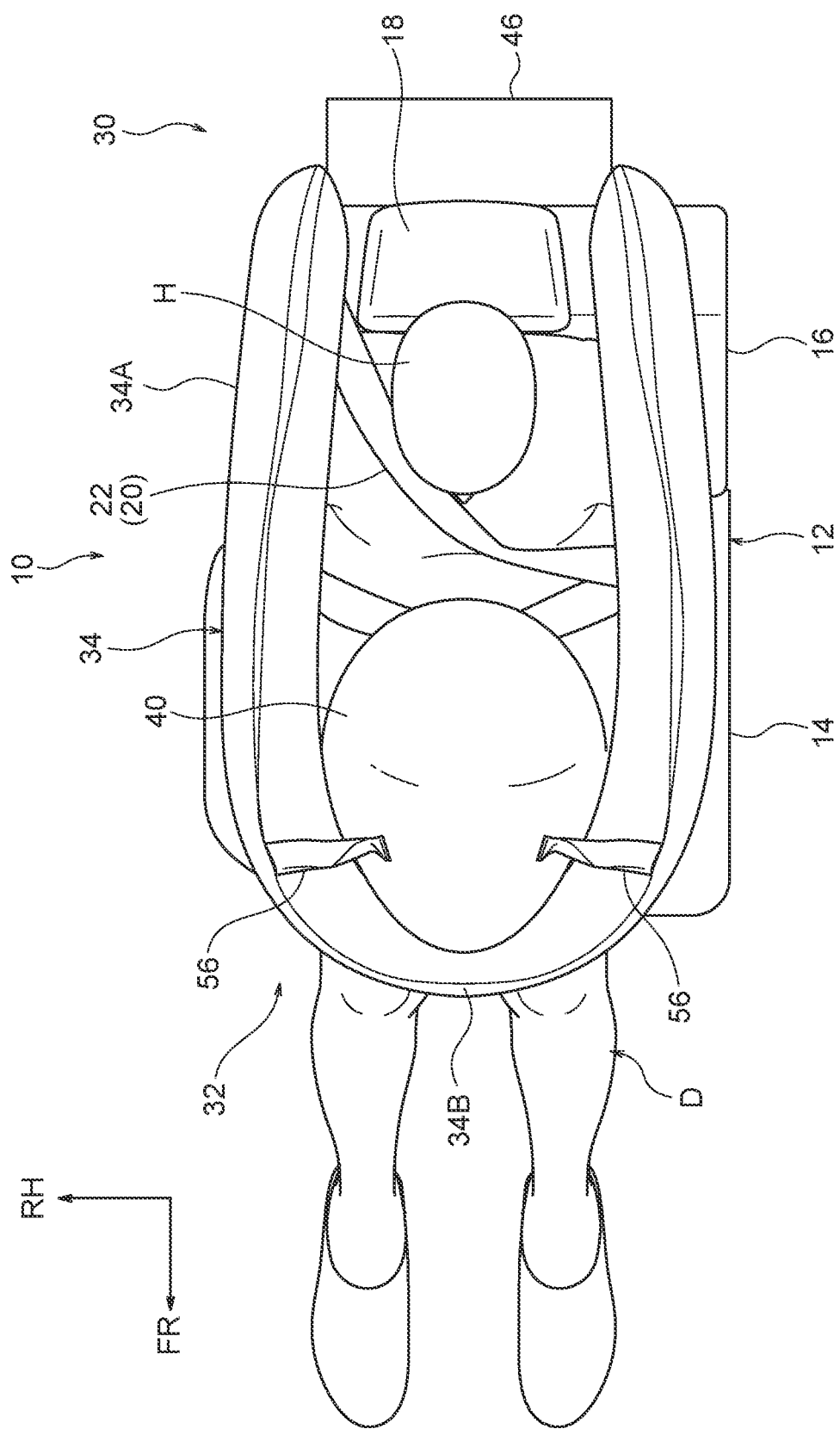
FIG. 3 is a plan view illustrating the structures shown in FIG. 1 in a state of being viewed from a vehicle upper side.
Figure 4:
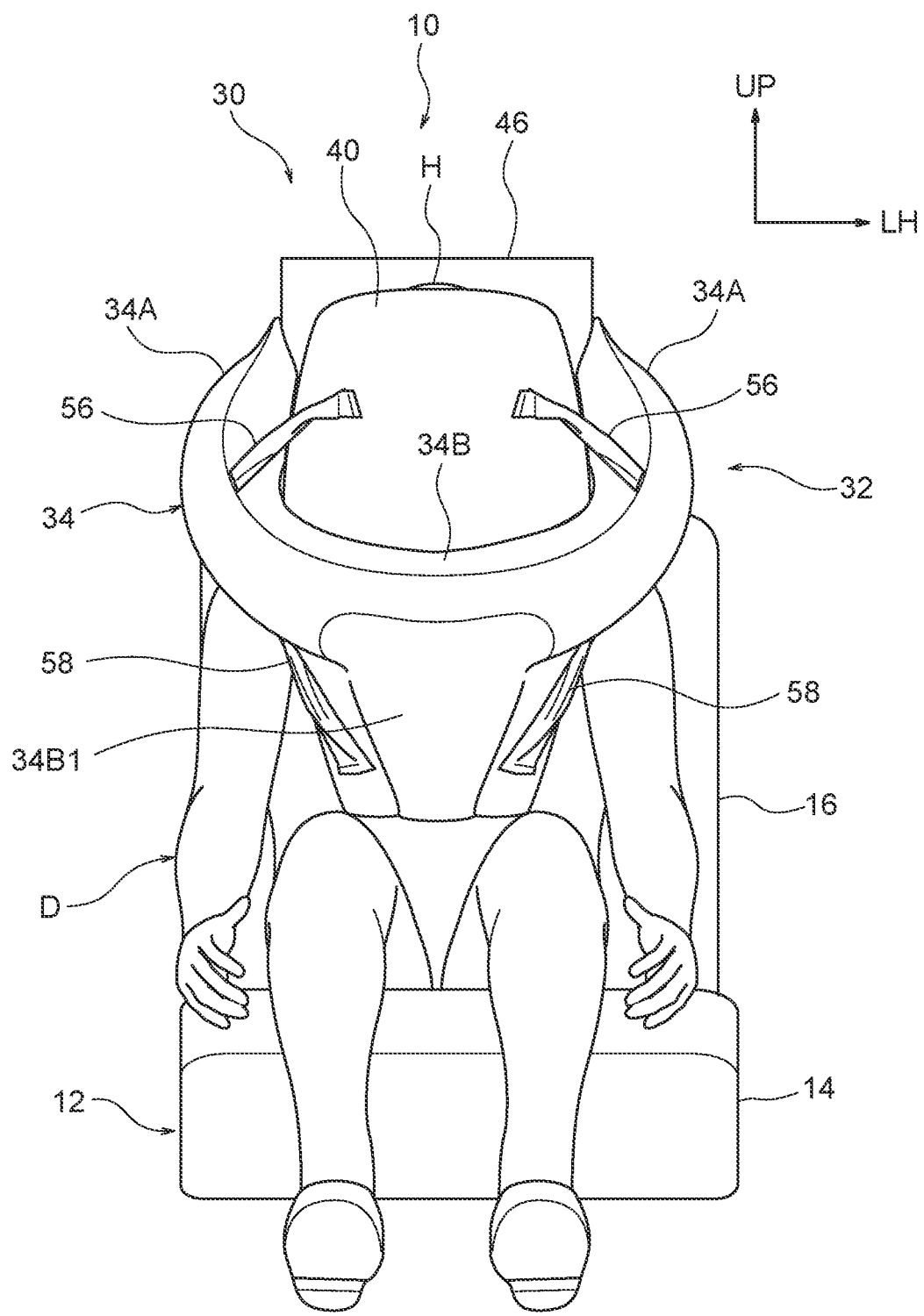
FIG. 4 is a front view illustrating the structures shown in FIG. 1 in a state of being viewed from a vehicle front side.
Figure 5:
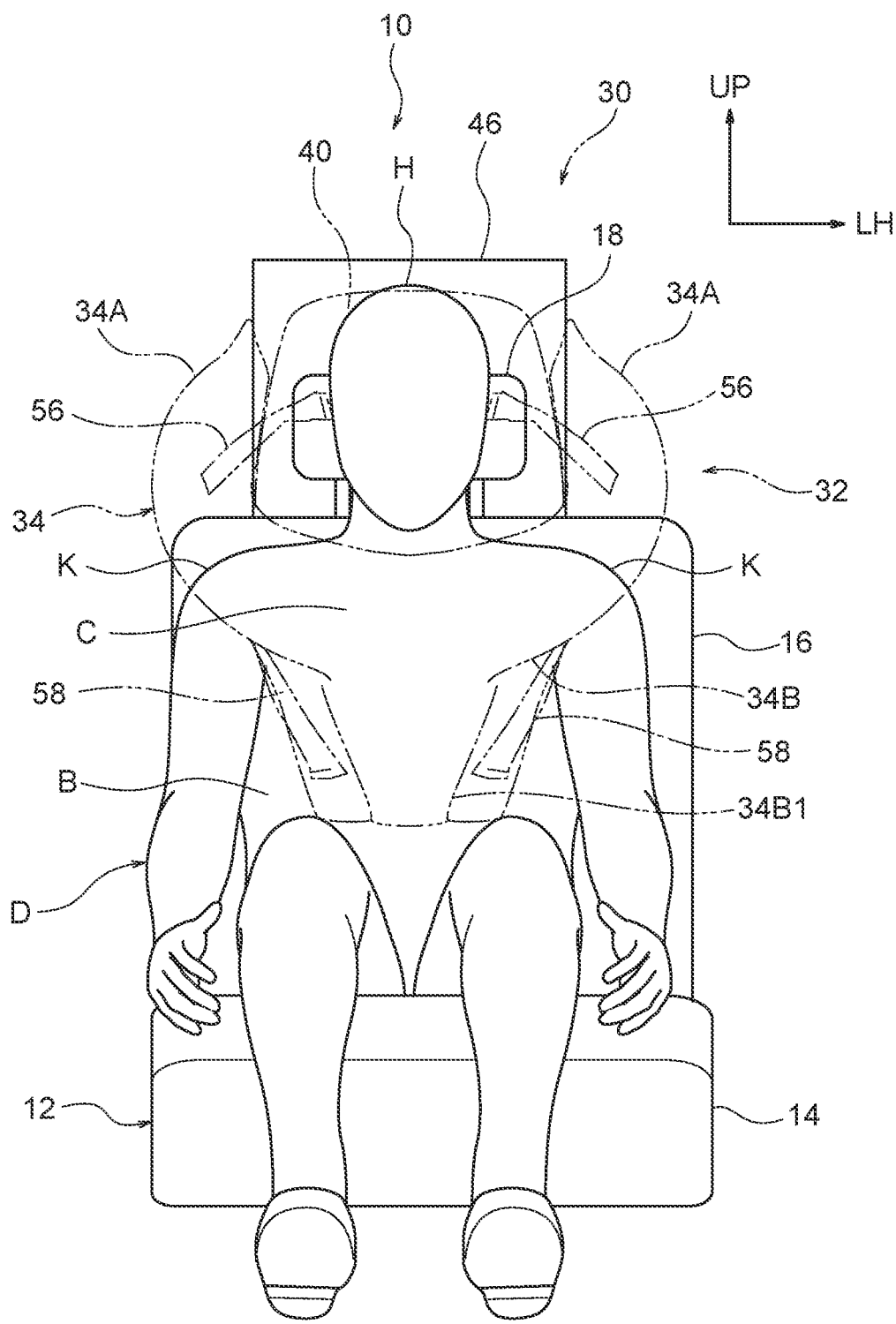
FIG. 5 is a front view illustrating the airbag of FIG. 4 in a state of viewing through the airbag.

The pair of front-rear extending portions 34A that have inflated and deployed extend in the front-rear direction at the respective left and right sides of the head H of the passenger D, and face the head H from the respective left and right sides with gaps therebetween respectively. The pair of front-rear extending portions 34A become postures of being inclined downward while heading toward the front side, by being tensed obliquely downward and rearward by a left and right pair of rear tethers 54 that are described later. The front end portions of the pair of front-rear extending portions 34A that have inflated and deployed are in states of being joined in the left-right direction by the connecting portion 34B that has inflated and deployed. As illustrated in FIG. 3, the front-rear chamber 34, which includes the pair of front-rear extending portions 34A and the connecting portion 34B, inflates and deploys in a U-shape that opens rearward as seen in plan view.

As illustrated in FIG. 1, FIG. 2, FIG. 4 and FIG. 5, an enlarged portion 34B1, whose dimension in the vertical direction is larger than that of the left and right both end portions of the connecting portion 34B, is provided at the left-right direction central portion of the connecting portion 34B that has inflated and deployed. This enlarged portion 34B1 protrudes-out further toward the lower side than the left and right both end portions of the connecting portion 34B. The aforementioned communication hole 48 is formed in the enlarged portion 34B1. The communication hole 48 is positioned at the rear side of the left-right direction central portion of the connecting portion 34B that has inflated and deployed. The gas from the inflators 44 passes-through the communication hole 48, and is supplied rearward into the interior of the airbag main body 40. Due thereto, the airbag main body 40 inflates and deploys at the rear of the connecting portion 34B and toward the passenger D side (the rear side), later than the front-rear chamber 34. Due to the inflation and deployment of the front-rear chamber 34, this airbag main body 40 passes through the gap between the head H of the passenger D and the ceiling (not illustrated) of the vehicle from the rear side toward the front side, and thereafter, inflates and deploys toward the rear side. The airbag main body 40 that has inflated and deployed faces the head H, chest C and abdomen B of the passenger D from the front side with a gap therebetween.

Figure 9:
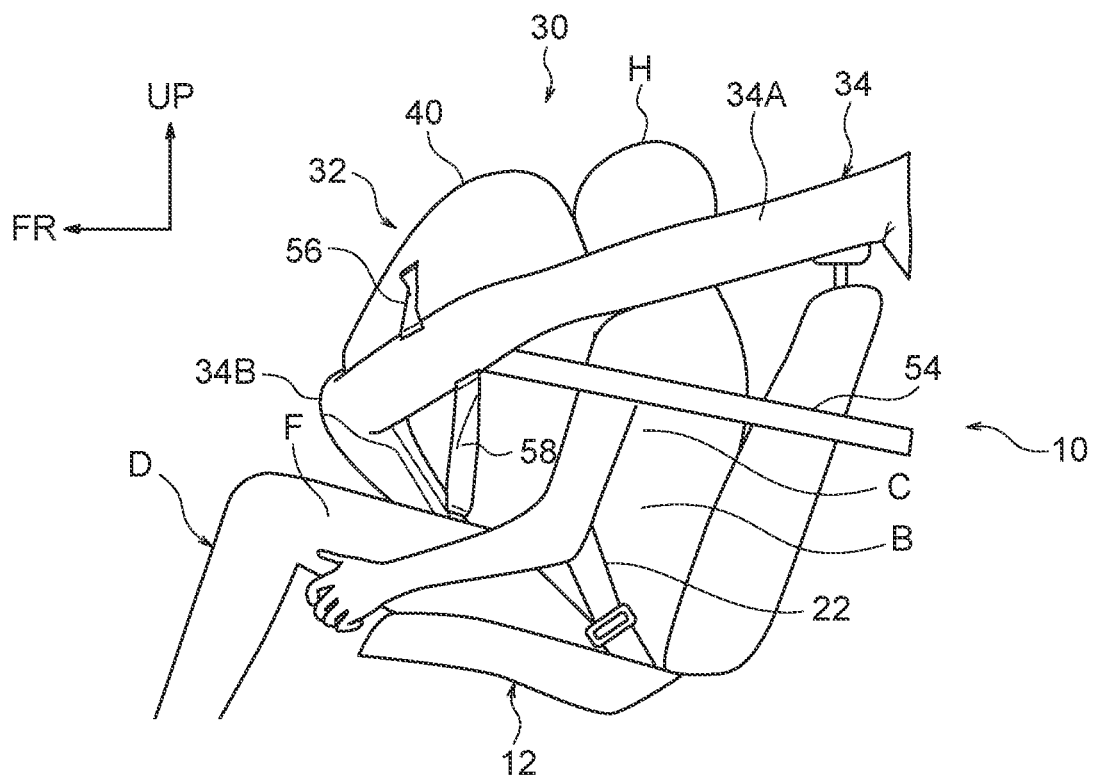
FIG. 9 is a side view illustrating a state in an initial stage of passenger restraining by the airbag.
Figure 10:
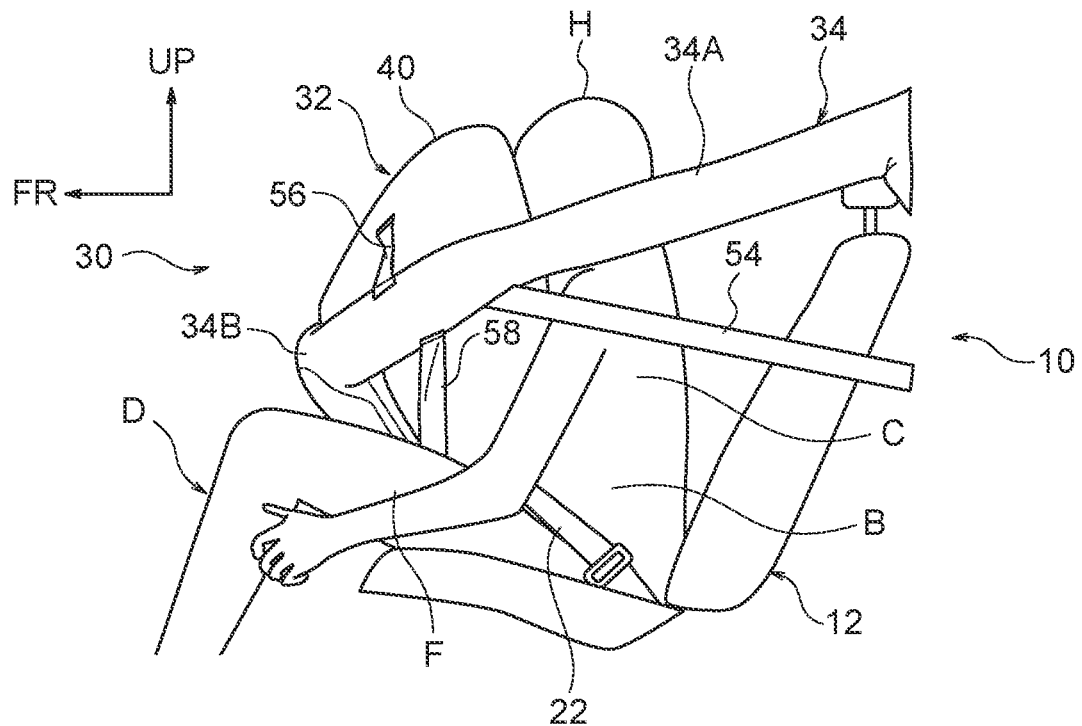
FIG. 10 is a side view illustrating a state in an intermediate stage of passenger restraining by the airbag.
Figure 11:
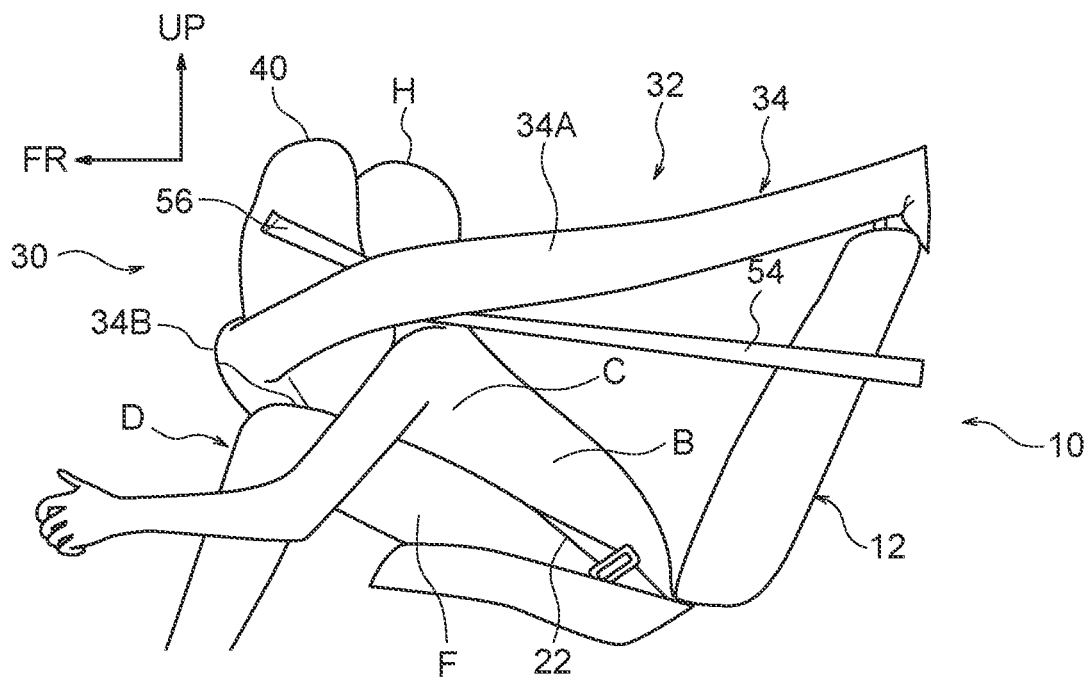
FIG. 11 is a side view illustrating a state in a latter stage of passenger restraining by the airbag.
Figure 12:
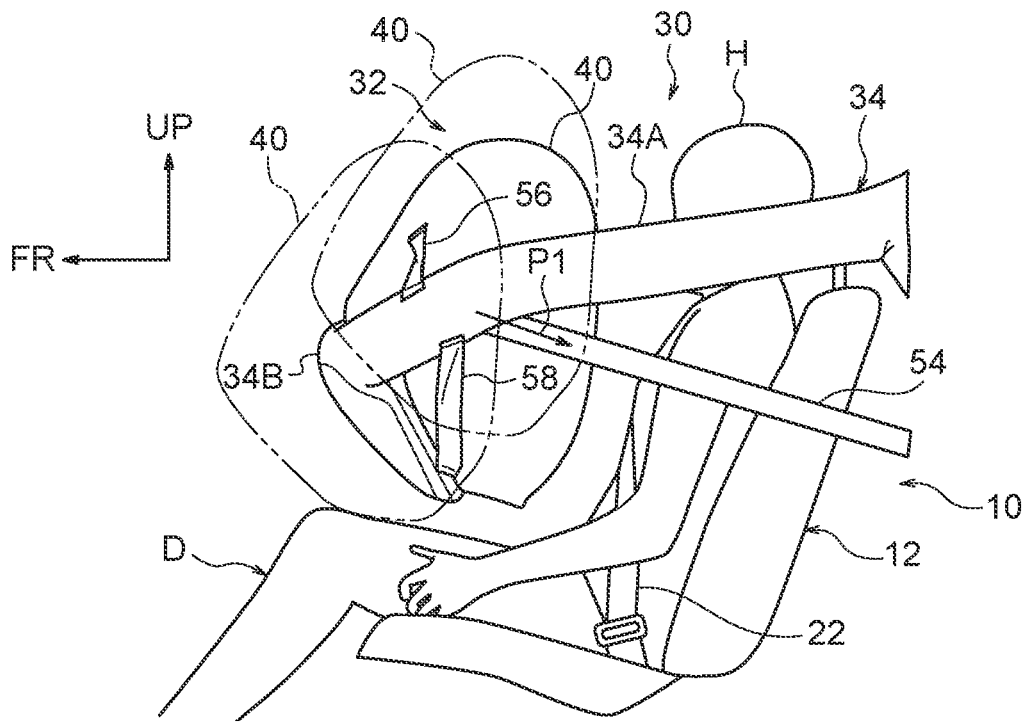
FIG. 12 is a side view for explaining the effect of suppressing swaying of the airbag by rear tethers.

As illustrated in FIG. 8 through FIG. 11, the airbag main body 40 that has inflated and deployed restrains, from the front side, the passenger D who inertially moves forward due to the impact of a vehicle collision. At this time of restraining the passenger, the front-rear chamber 34 is stretched in the front-rear direction, and the airbag main body 40 is compressed in the front-rear direction. The shape of the airbag main body 40 is set such that the airbag main body 40 is sandwiched between thighs F and the chest C of the passenger D, from an intermediate stage to the latter stage of the time of passenger restraining, as illustrated in FIG. 9 through FIG. 11.

The left and right pair of rear tethers 54, a left and right pair of front upper tethers 56, and a left and right pair of front lower tethers 58 are attached to the airbag 32 of the above-described structure. The rear tethers 54, the front upper tethers 56 and the front lower tethers 58 are structured in the shapes of elongated strips by fabric materials of nylon or polyester for example. The fabric materials that structure the rear tethers 54, the front upper tethers 56 and the front lower tethers 58 are structured to be harder to stretch than the base fabrics 36, 38 that structure the front-rear chamber 34 and the base fabric 42 that structures the airbag main body 40. This difficulty of stretching can be adjusted by the material, the thickness or the like of the fabric.

Respective one end portions of the pair of rear tethers 54 are attached (sewn) to respective length direction intermediate portions of the pair of front-rear extending portions 34A (in detail, the front portions of the respective front-rear extending portions 34A that have inflated and deployed). The respective other end portions of the pair of rear tethers 54 are respectively attached to the seatback 16 or the unillustrated vehicle body, further toward the rear side than the passenger D. In the state in which the airbag 32 has inflated and deployed, the pair of rear tethers 54 extend in the front-rear direction beneath the pair of front-rear extending portions 34A. In this state, the pair of rear tethers 54 are in postures of being inclined downward while heading rearward. Due thereto, the pair of front-rear extending portions 34A are pulled-in obliquely rearward and downward by the pair of rear tethers 54 (refer to arrow P1 in FIG. 12). Due thereto, at the time of completion of the inflation and deployment of the airbag 32, the airbag 32 swaying in the vertical direction and the front-rear direction is suppressed (refer to the airbags 32 illustrated by the two-dot chain lines in FIG. 12).

Figure 13:
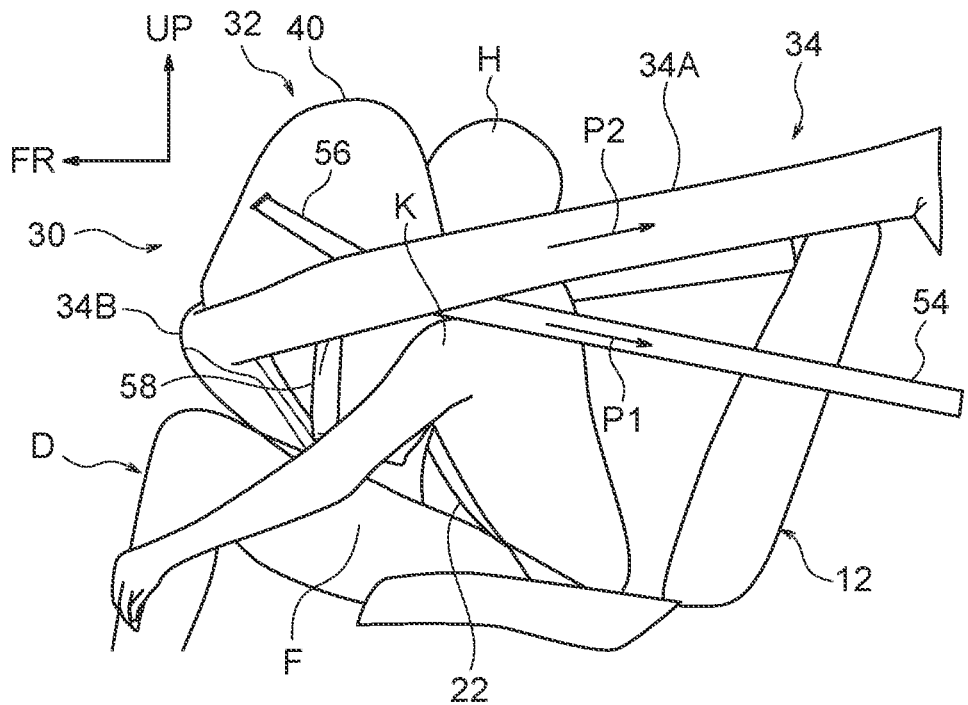
FIG. 13 is a side view for explaining abutment of the front-rear chamber with shoulders of a passenger.
Figure 14:
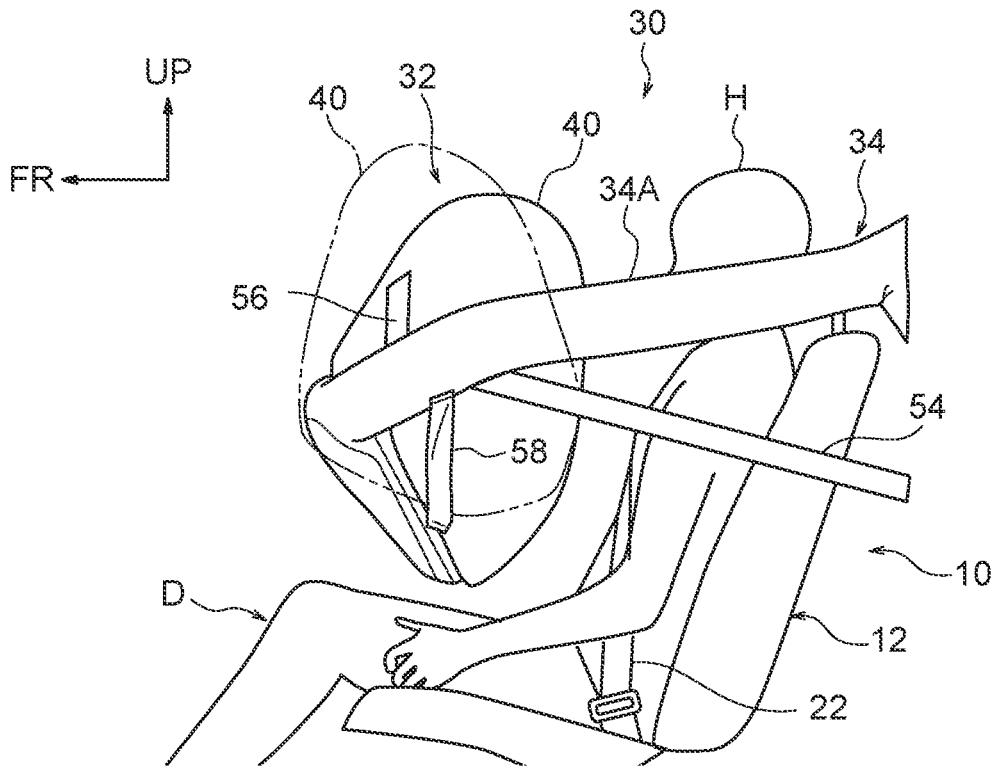
FIG. 14 is a side view for explaining the effect of suppressing swaying of the airbag by front upper tethers.
Figure 15:
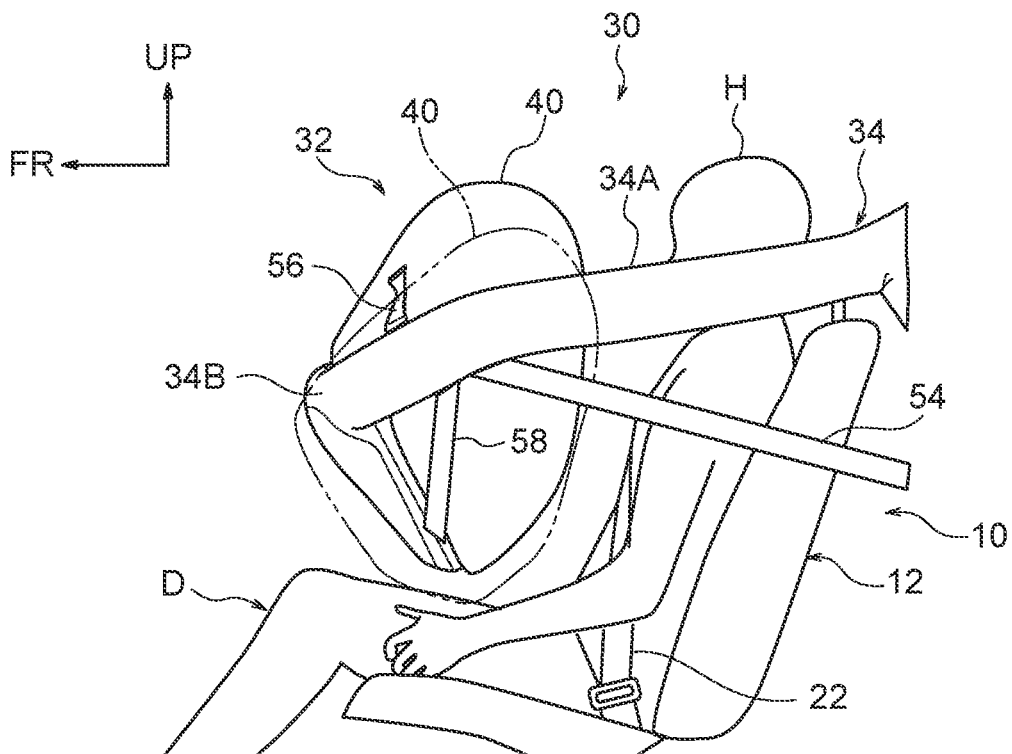
FIG. 15 is a side view for explaining the effect of suppressing swaying of the airbag by front lower tethers.

Due to the pair of front-rear extending portions 34A being pulled-in as described above, at the time of passenger restraining by the airbag 32, the lower surfaces of the pair of front-rear extending portions 34A abut left and right shoulders K of the passenger D (see FIG. 13). At this time of passenger restraining by the airbag 32, the airbag main body 40 is supported by the tensile loads of the pair of front-rear extending portions 34A and the pair of rear tethers 54 (refer to arrow P1 and arrow P2 in FIG. 13). Note that, although the passenger D is an AM50 in the present embodiment, the lengths of the pair of rear tethers 54 are set such that the lower surfaces of the pair of front-rear extending portions 34A abut the left and right shoulders K of the passenger D even in cases in which the passenger D is an AM95 (95th percentile U.S. adult male) or is an AF05 (5th percentile U.S. adult female).

The pair of front upper tethers 56 connect the front portions of the pair of front-rear extending portions 34A, and the left and right both side regions at the front portion of the upper portion, which inflates and deploys further toward the upper side than the front-rear chamber 34, of the airbag main body 40. Respective one end portions of the pair of front upper tethers 56 are respectively sewn to the left and right both side regions at the front portion of the upper portion, which inflates and deploys further toward the upper side than the front-rear chamber 34, of the airbag main body 40. Respective other end portions of the pair of front upper tethers 56 are respectively sewn to the front portions of the pair of front-rear extending portions 34A. At the time of completion of the inflation and deployment of the airbag 32, the pair of front upper tethers 56 suppress upward rotation of the airbag main body 40 around the connecting portion 34B (refer to the airbag main body 40 illustrated by the two-dot chain line in FIG. 14).

The pair of front lower tethers 58 connect the front portions of the pair of front-rear extending portions 34A, and the left and right both side regions at the lower portion, which inflates and deploys further toward the lower side than the front-rear chamber 34, of the airbag main body 40. Respective one end portions of the pair of front lower tethers 58 are respectively sewn to the left and right both side regions at the lower portion, which inflates and deploys further toward the lower side than the front-rear chamber 34, of the airbag main body 40. Respective other end portions of the pair of front lower tethers 58 are respectively sewn to the front portions of the pair of front-rear extending portions 34A. At the time of completion of the inflation and deployment of the airbag 32, the pair of front lower tethers 58 suppress downward rotation of the airbag main body 40 around the connecting portion 34B (refer to the airbag main body 40 illustrated by the two-dot chain line in FIG. 15).

Figure 16:
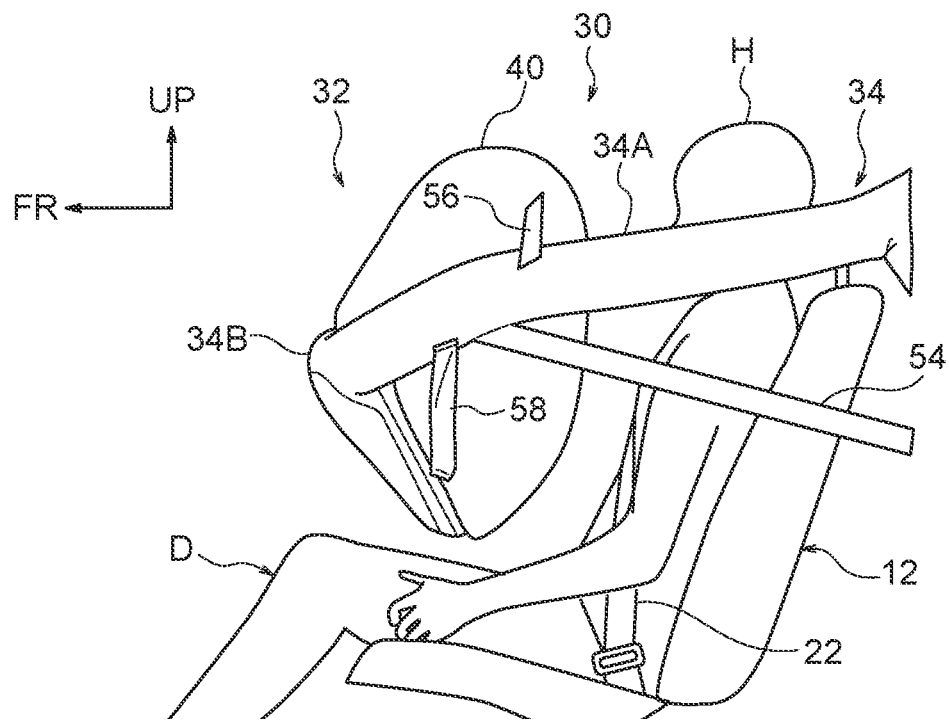
FIG. 16 is a side view illustrating an example in which attached positions of the front upper tethers are unsuitable, and is a drawing illustrating a state immediately before passenger restraining by the airbag.
Figure 17:
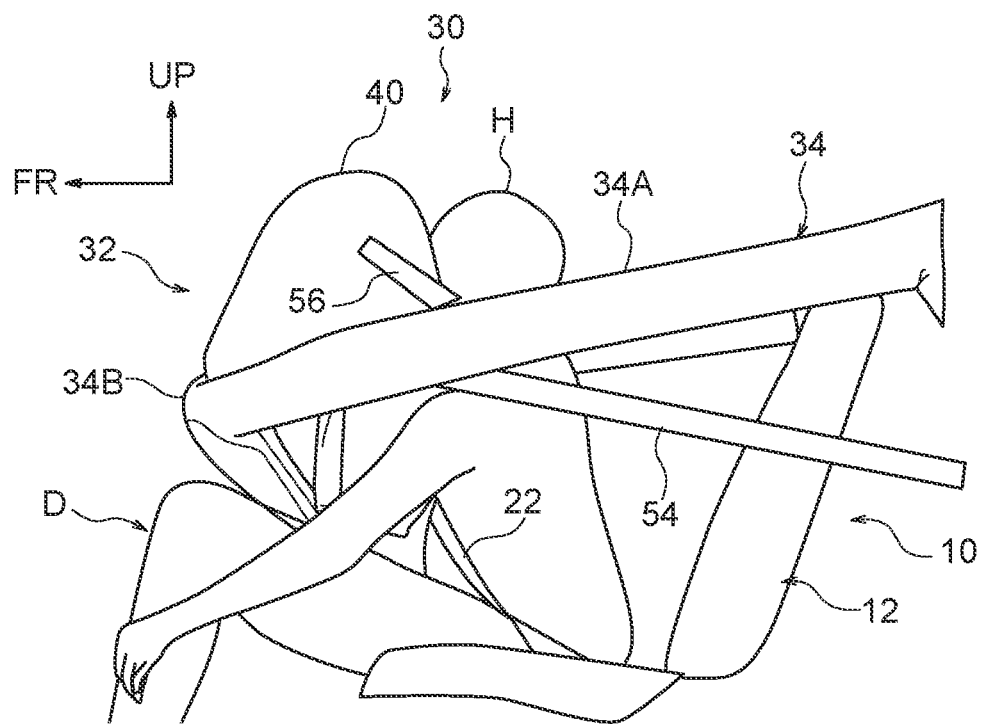
FIG. 17 is a side view illustrating an example in which attached positions of the front upper tethers are unsuitable, and is a drawing illustrating a state in the latter stage of passenger restraining by the airbag.

Note that, as illustrated in FIG. 16, the following problem arises in a case in which respective one end portions of the pair of front upper tethers 56 are respectively sewn to the left and right both side regions at the rear portion of the upper portion, which inflates and deploys further toward the upper side than the front-rear chamber 34, of the airbag main body 40. Namely, as illustrated in FIG. 17, at the time of passenger restraining by the airbag 32, compressive deformation of the airbag main body 40 is impeded due to the pair of front upper tethers 56 tensing. Therefore, the respective one end portions of the pair of front upper tethers 56 must be sewn respectively to left and right both side regions at the front portion of the upper portion, which inflates and deploys further toward the upper side than the front-rear chamber 34, of the airbag main body 40.

The above-described airbag device 30 has an unillustrated control device (ECU) that controls operation of the pair of inflators 44. The control device is electrically connected to the pair of inflators 44 and to an unillustrated collision sensor. On the basis of information from the collision sensor, the control device can sense or predict, for each type of collision described hereinafter, the occurrence of a front collision of any of various types (or the fact that a front collision is inevitable) at the automobile to which the airbag device 30 is applied.

When the control device senses or predicts a front collision on the basis of information from the collision sensor, the control device causes the pair of inflators 44 to operate. Note that, in addition to full-overlap front collisions, offset front collisions such as oblique collisions and small overlap collisions and the like are included among the types of front collisions in which the control device causes the inflators 44 to operate.

(Operation and Effects)

Operation and effects of the first embodiment are described next.

The passenger protecting device 10 relating to the present embodiment has the vehicle seat 12 in which the passenger D of the vehicle sits, and the airbag device 30 that protects the passenger D at the time of a collision of the vehicle. At this airbag device 30, at the time of a collision of the vehicle, gas generated from the pair of inflators 44 is supplied to the airbag 32, and the airbag 32 inflates and deploys from the rear side of the upper portion of the vehicle seat 12 toward the front side.

The airbag 32 has the front-rear chamber 34 and the airbag main body 40. The front-rear chamber 34 has the left and right pair of front-rear extending portions 34A that pass the respective left and right sides of the head H of the passenger D and inflate and deploy toward the front side, and the connecting portion 34B that connects the front end portions of the pair of front-rear extending portions 34A in the left-right direction. The airbag main body 40 inflates and deploys at the rear side of the connecting portion 34B toward the passenger D side, later than the front-rear chamber 34. At the time of restraining the passenger D, the airbag main body 40 is compressed in the front-rear direction while stretching the front-rear chamber 34 in the front-rear direction. The energy absorbing performance can be improved by the compressive deformation of the airbag main body 40. Namely, in a case in which both the front-rear chamber 34 and the airbag main body 40 receive tensile load, the load that is applied from the airbag main body 40 to the passenger D increases greatly, but, in the present embodiment, the load that is applied to the passenger D is reduced by the compressive deformation of the airbag main body 40.

Further, in the present embodiment, after the inflation and deployment of the front-rear chamber 34, the airbag main body 40 inflates and deploys toward the passenger D side (i.e., the rear side) at the rear side of the connecting portion 34B. Due thereto, the gap between the airbag main body 40 and the passenger D becomes small. As a result, the passenger D is restrained by the airbag main body 40 at an early stage, and therefore, the performance of the airbag main body 40 of restraining the passenger D at an early stage can be improved.

Further, in the present embodiment, gas from the inflators 44 is supplied to the airbag main body 40 via the communication hole 48 that is positioned at the rear side of the left-right direction central portion of the connecting portion 34B of the front-rear chamber 34 in the inflated and deployed state of the front-rear chamber 34. Namely, the gas, which has passed through the pair of front-rear extending portions 34A and the connecting portion 34B of the front-rear chamber 34, is supplied from the communication hole 48 toward the rear side and into the airbag main body 40. Due thereto, the airbag main body 40 can be inflated and deployed sufficiently later than the front-rear chamber 34. As a result, for example, it is easy to cause the airbag main body 40 to pass through the narrow gap between the head H of the passenger D and the ceiling (not illustrated) of the vehicle, and to inflate and deploy the airbag 32.

Namely, in the present embodiment, the airbag main body 40 passes through the gap between the head H of the passenger D and the ceiling of the vehicle from the rear side toward the front side due to the inflation and deployment of the front-rear chamber 34, and thereafter, inflates and deploys toward the rear side. Due thereto, it is easy to prevent the airbag main body 40 from becoming stuck in the aforementioned gap, and therefore, it is easy to prevent poor deployment of the airbag.

Figure 18:
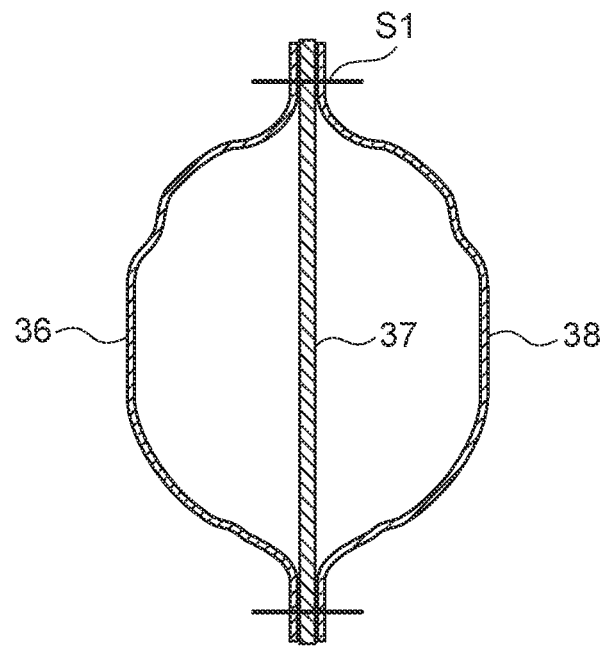
FIG. 18 is a cross-sectional view illustrating, in an enlarged manner, an example in which one of the plural base fabrics that structure the front-rear chamber is a base fabric that is hard to stretch.

Further, in the present embodiment, the base fabrics 36, 38 that structure the front-rear chamber 34 include a base fabric that is harder to stretch than the base fabric 42 that structures the airbag main body 40. Specifically, the front-rear chamber 34 is a structure in which the two base fabrics 36, 38 are superposed, and the peripheral edge portions thereof are sewn together. One or both of the two base fabrics 36, 38 are the aforementioned base fabric that is hard to stretch. Note that, as illustrated in FIG. 18, there may be a structure in which a base fabric 37 that is harder to stretch than the base fabric of the airbag main body 40 is disposed between the two base fabrics 36, 38. In the structure illustrated in FIG. 18, the two base fabrics 36, 38 have a difficulty of stretching that is similar to that of the base fabric 42 that structures the airbag main body 40.

Figure 19:
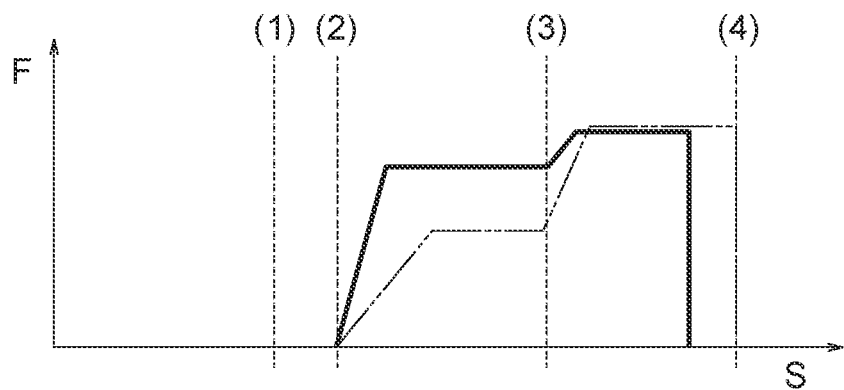
FIG. 19 is a graph showing the relationship between load applied to the chest of the passenger and displacement of the chest.

Due to the front-rear chamber 34 being structured as described above, the amount of energy absorbed by the stretching of the front-rear chamber 34 in the front-rear direction can be improved as shown by the graphed solid line in FIG. 19. Note that, in FIG. 19, vertical axis F is the load applied to the chest C of the passenger D from the airbag main body 40, and horizontal axis S is the displacement of the chest C of the passenger D. In FIG. 19, a case in which the base fabrics that structure the front-rear chamber 34 have a difficulty of stretching that is similar to that of the base fabric that structures the airbag main body 40 is illustrated by the graphed two-dot chain line. By structuring the airbag 32 as in the present embodiment, the amount of energy that is absorbed improves particularly in the segment from (2) to (3) in FIG. 19. Note that, in a case in which the front-rear chamber 34 is a structure that does not have the base fabric 37, the number of base fabrics and the volume of the airbag 32 that is in the folded-up state are smaller than in the structure illustrated in FIG. 18. In the present embodiment, because the front-rear chamber 34 and the airbag main body 40 are produced by separate base fabrics, the difficulty of stretching of the base fabrics of the front-rear chamber 34 and the difficulty of stretching of the base fabric of the airbag main body 40 can be changed.

Further, in the present embodiment, the shape of the airbag main body 40 is set such that the airbag main body 40 is sandwiched between the thighs F and the chest C of the passenger D from an intermediate stage through the latter stage of the time when the passenger is restrained by the airbag 32. Due thereto, the upper body of the passenger D can be made to contact the airbag main body 40 over a wide surface area, and therefore, the load applied from the airbag main body 40 to the passenger D can be reduced well.

Further, in accordance with the present embodiment, at the time when the passenger D is restrained by the airbag 32, the pair of rear tethers 54, whose respective one end portions are sewn to the pair of front-rear extending portions 34A of the front-rear chamber 34 and whose respective other end portions are attached to the seatback 16 or the vehicle body further toward the seat rear side than the passenger D, pull the pair of front-rear extending portions 34A in toward obliquely rearward and downward sides of the seat. The pair of rear tethers 54 are stretched in the front-rear direction together with the front-rear chamber 34 at the time when the passenger is restrained by the airbag main body 40. These rear tethers 54, together with the front-rear chamber 34, receive and support the load that is applied from the passenger D to the airbag main body 40.

Moreover, due to the above-described pulling-in by the pair of rear tethers 54, swaying of the airbag 32 in the vertical direction and the front-rear direction at the time when inflation and deployment are completed can be suppressed. Moreover, due to the above-described pulling-in by the pair of rear tethers 54, the lower surfaces of the pair of front-rear extending portions 34A abut the left and right shoulders K of the passenger D. Due thereto, the vertical direction position of the airbag main body 40 with respect to the head H of the passenger D can be stabilized, regardless of differences in physiques of the passengers D.

In the present embodiment, the front portion of the upper portion, which inflates and deploys further toward the upper side than the front-rear chamber 34, of the airbag main body 40, and the pair of front-rear extending portions 34A of the front-rear chamber 34, are connected by the pair of front upper tethers 56, respectively. Due thereto, the airbag main body 40, which has inflated and deployed, being displaced (rotating) inadvertently toward the upper side around the connecting portion 34B with respect to the front-rear chamber can be suppressed.

Moreover, in the present embodiment, the lower portion, which inflates and deploys further toward the lower side than the front-rear chamber 34, of the airbag main body 40, and the pair of front-rear extending portions 34A of the front-rear chamber 34, are connected by the pair of front lower tethers 58, respectively. Due thereto, the airbag main body 40, which has inflated and deployed, being displaced (rotating) inadvertently toward the lower side around the connecting portion 34B with respect to the front-rear chamber 34 can be suppressed.

Other embodiments of the present disclosure are described next. Note that structures and operations that are basically similar to those of embodiments described previously are denoted by the same reference numerals as in the previously-described embodiments, and description thereof is omitted.

Second Embodiment

Figure 20:
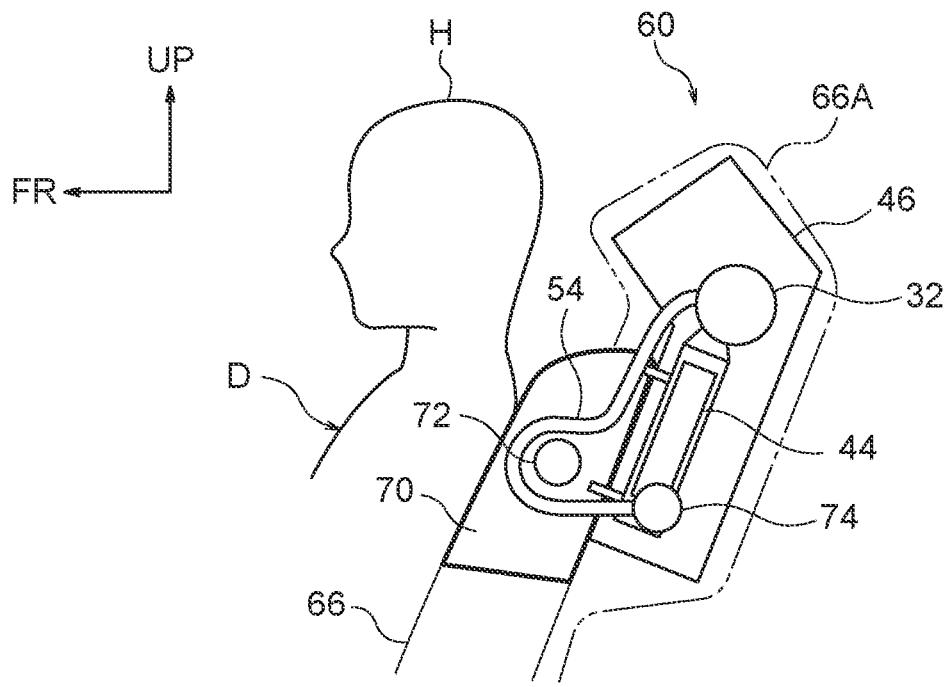
FIG. 20 is a side sectional view of main portions illustrating a state before inflation and deployment of the airbag, in a passenger protecting device relating to a second embodiment.

Main portions in a state before the airbag 32 inflates and deploys at a passenger protecting device 60 relating to a second embodiment of the present disclosure are illustrated in a side view in FIG. 20. A state immediately after completion of inflation and deployment of the airbag 32 in the passenger protecting device 60 relating to the second embodiment is illustrated in a side view in FIG. 21. A state in the latter stage of passenger restraining by the airbag 32 in the passenger protecting device 60 relating to the second embodiment is illustrated in a side view in FIG. 22. A portion of a bench seat 62, which serves as a vehicle seat and at which the passenger protecting device 60 relating to the second embodiment is provided, is illustrated in a front view in FIG. 23.

Figure 22:
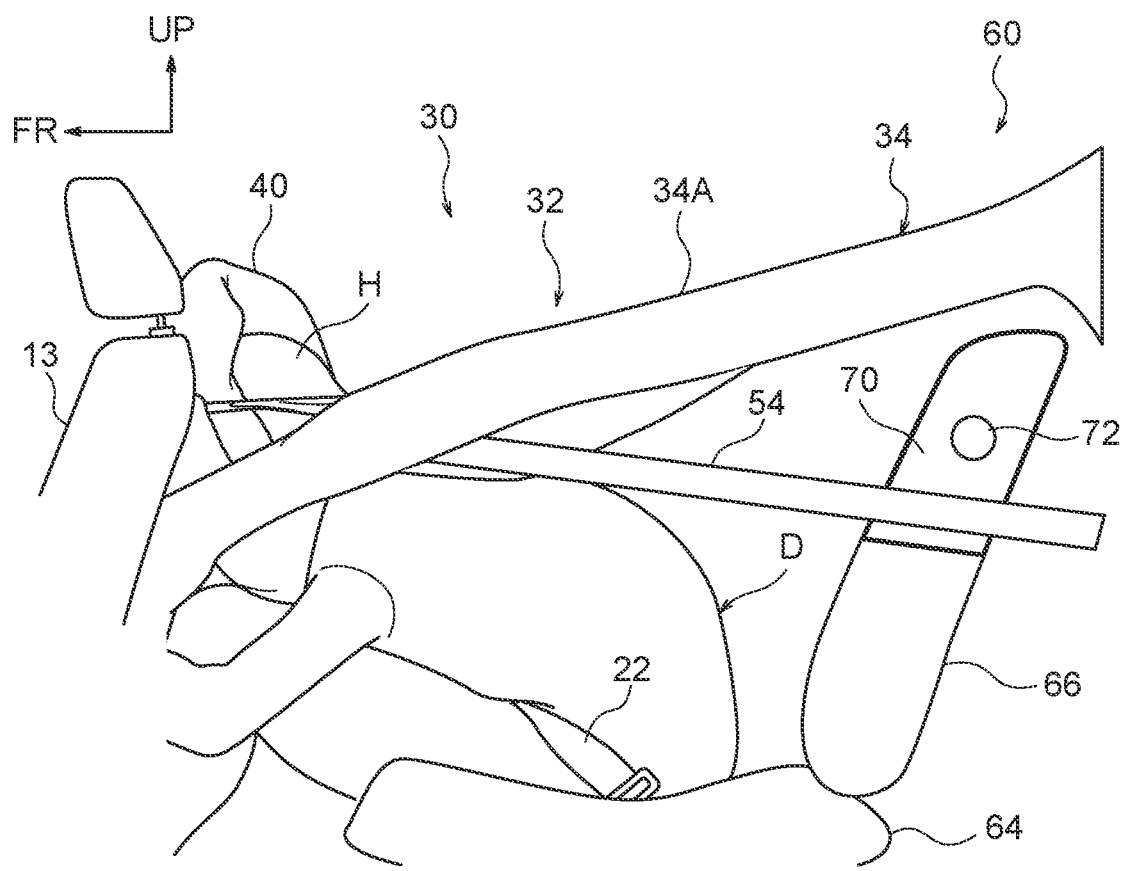
FIG. 22 is a side sectional view illustrating a state in the latter stage of passenger restraining by the airbag, in the passenger protecting device relating to the second embodiment.
Figure 23:
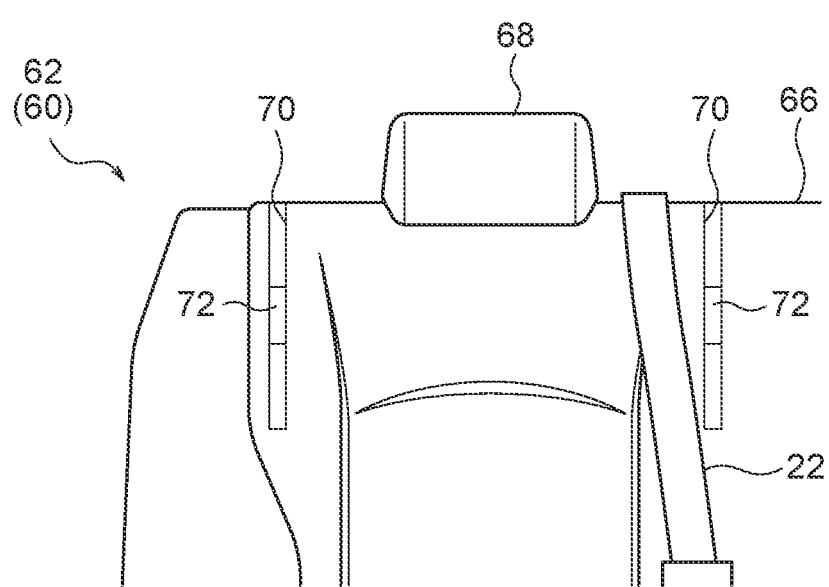
FIG. 23 is a front view illustrating a portion of a vehicle seat at which the passenger protecting device relating to the second embodiment is provided.

The bench seat 62 is, for example, a rear seat of the vehicle. The right side portion of the bench seat 62 is illustrated in FIG. 23. In FIG. 22, reference numeral 13 is a front seat of the vehicle. The bench seat 62 has a seat cushion 64, a seatback 66 having an outer surface 66A and a headrest 68. A left and right pair of slits 70 that extend in the seat vertical direction are formed in the seatback 66. The pair of slits 70 are disposed at the respective seat left-right direction sides of the passenger seated at the right-side portion of the bench seat 62. As illustrated in FIG. 20, respective portions (length direction intermediate portions) of the pair of rear tethers 54 are inserted through the pair of slits 70 respectively, in the state before inflation and deployment of the airbag 32. Note that illustration of the pair of rear tethers 54 is omitted in FIG. 23.

Respective one end portions of the pair of rear tethers 54 are sewn to length direction intermediate portions of the pair of front-rear extending portions 34A, respectively. Respective other end portions of the pair of rear tethers 54 are attached respectively to a left and right pair of fixing portions 74 that are provided at the frame of the seatback 66 or at the vehicle body, at the rear of the pair of slits 70. Wound-along portions 72, along which length direction intermediate portions of the pair of rear tethers 54 are wound from the front sides, are provided within the pair of slits 70, respectively. These wound-along portions 72 are fixed to the unillustrated frame of the seatback 66. In the present embodiment, the module case 46 extends further toward the upper side and the front side than in the first embodiment. The module case 46 is covered by the skin of the seatback 66. In the present embodiment, structures other than those described above are similar to those of the first embodiment.

Figure 21:
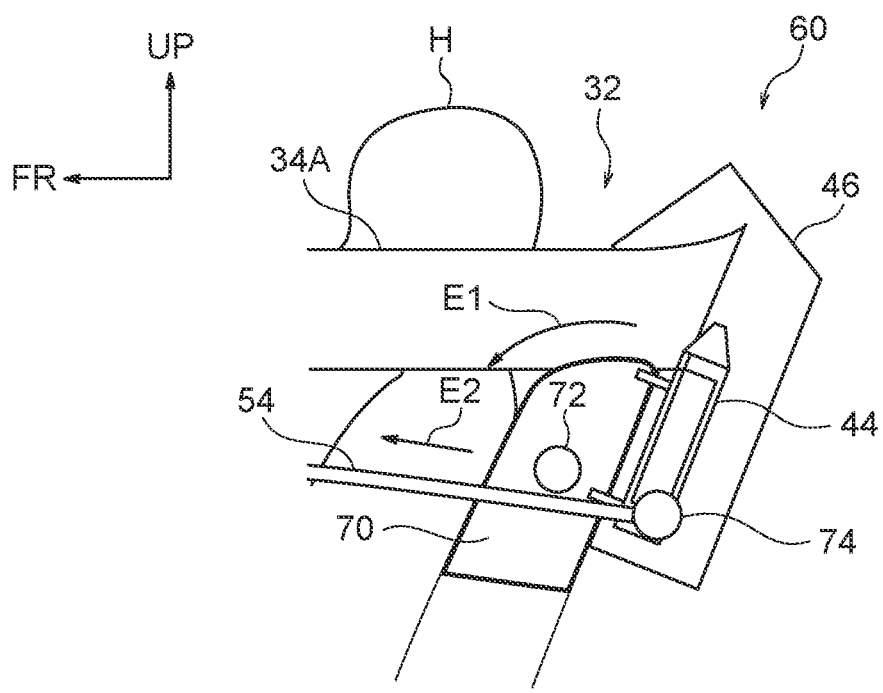
FIG. 21 is a side sectional view of main portions illustrating a state immediately after completion of inflation and deployment of the airbag, in the passenger protecting device relating to the second embodiment.

In this embodiment, at the time of inflation and deployment of the airbag 32, when the front-rear chamber 34 inflates and deploys toward the front side, the pair of rear tethers 54 whose respective one end portions are sewn to the pair of front-rear extending portions 34A are pulled-out from the interiors of the pair of slits 70 (refer to arrow E1 in FIG. 21), and are deployed toward the front side (refer to arrow E2 in FIG. 21). Because the passenger protecting device 60 is structured in this way, even in a case in which the vehicle seat is the bench seat 62, the pair of rear tethers 54 can be provided, and effects that are basically similar to those of the first embodiment are obtained. Further, the deploying direction of the pair of rear tethers 54 can be regulated by the pair of slits 70.

Third Embodiment

Figure 24:
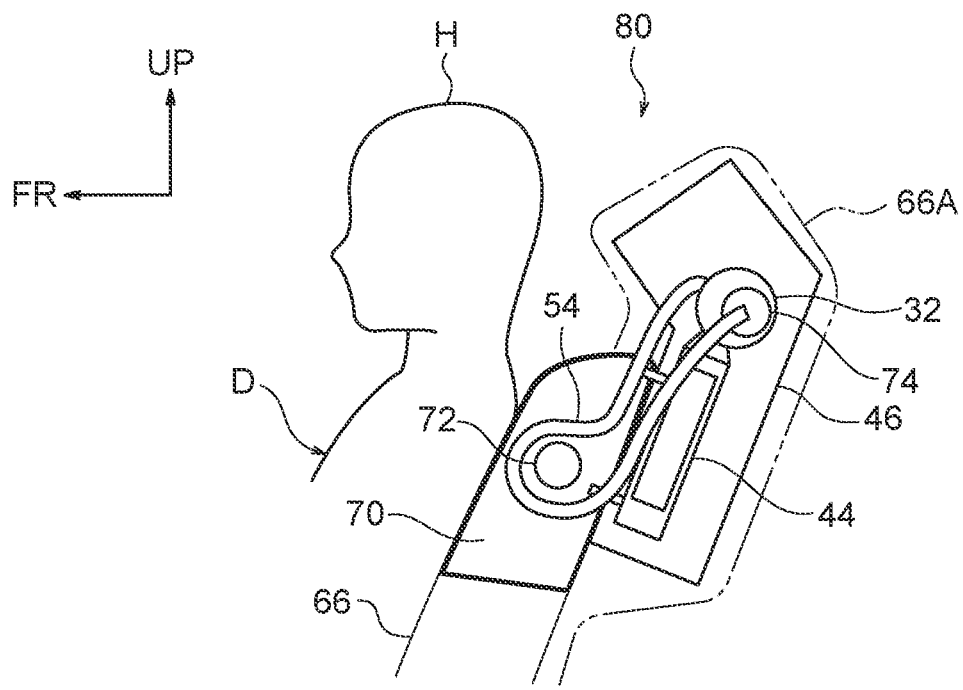
FIG. 24 is a side sectional view illustrating a state before inflation and deployment of the airbag, in a passenger protecting device relating to a third embodiment.

Main portions in a state before inflation and deployment of the airbag 32 in a passenger protecting device 80 relating to a third embodiment of the present disclosure are illustrated in a side view in FIG. 24. Main portions in a state immediately after completion of inflation and deployment of the airbag 32 in the passenger protecting device 80 relating to the third embodiment are illustrated in a side view in FIG. 25. A state in the latter stage of passenger restraining by the airbag 32 in the passenger protecting device 80 relating to the third embodiment is illustrated in a side view in FIG. 26.

Figure 25:
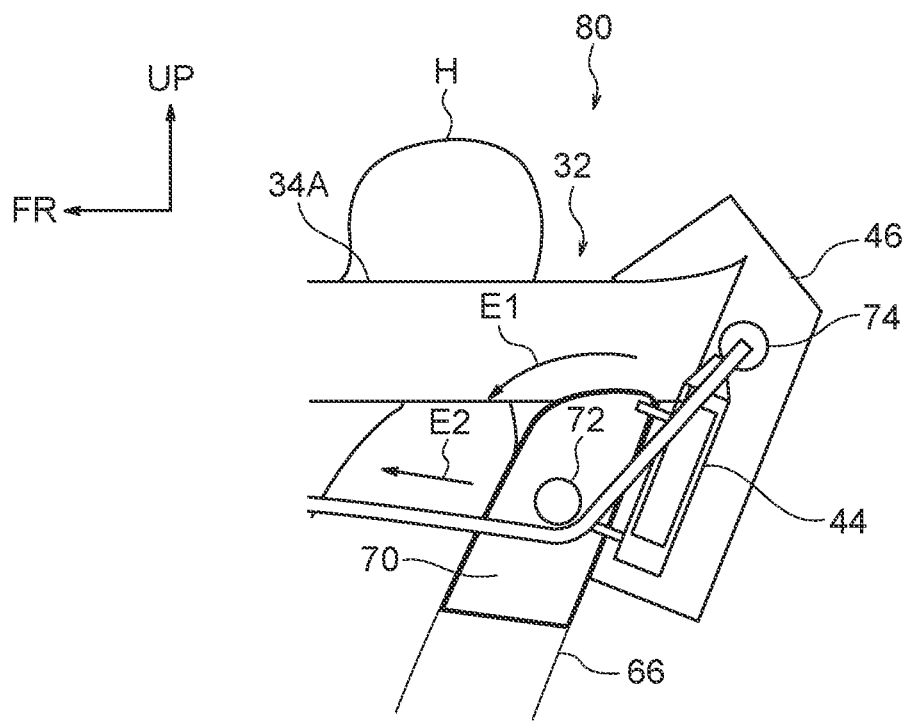
FIG. 25 is a side sectional view of main portions illustrating a state immediately after completion of inflation and deployment of the airbag, in the passenger protecting device relating to the third embodiment.
Figure 26:
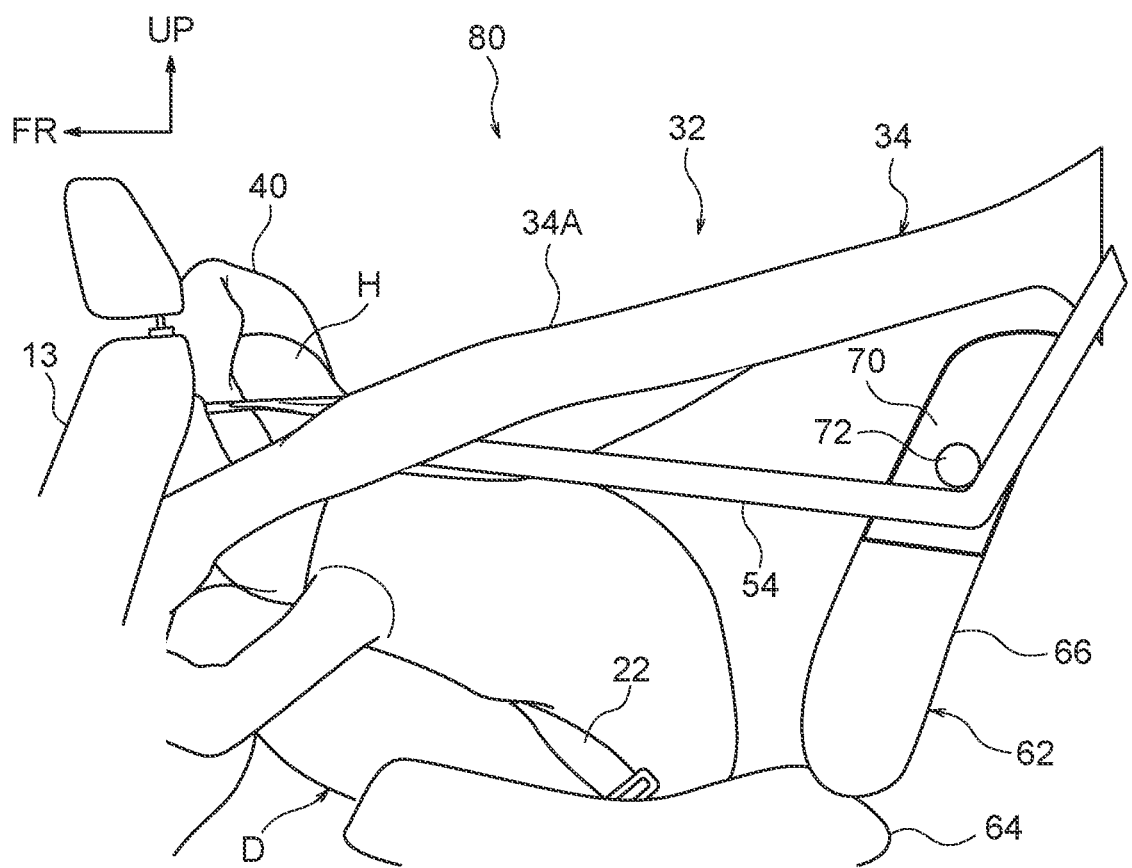
FIG. 26 is a side sectional view illustrating a state in the latter stage of passenger restraining by the airbag, in the passenger protecting device relating to the third embodiment.

This embodiment has a structure that is similar to that of the second embodiment. In this embodiment, the respective other end portions of the pair of rear tethers 54 are respectively attached to the left and right pair of fixing portions 74 that are provided at the vehicle body further toward the rear side than the seatback 16 and further toward the upper side than the inflators 44. In this embodiment, as illustrated in FIG. 25 and FIG. 26, in the inflated and deployed state of the airbag 32, the pair of rear tethers 54 are in states of being bent at the portions thereof that are wound along the pair of wound-along portions 72. In this embodiment as well, effects that are basically similar to those of the second embodiment are obtained.

Fourth Embodiment

Figure 27:
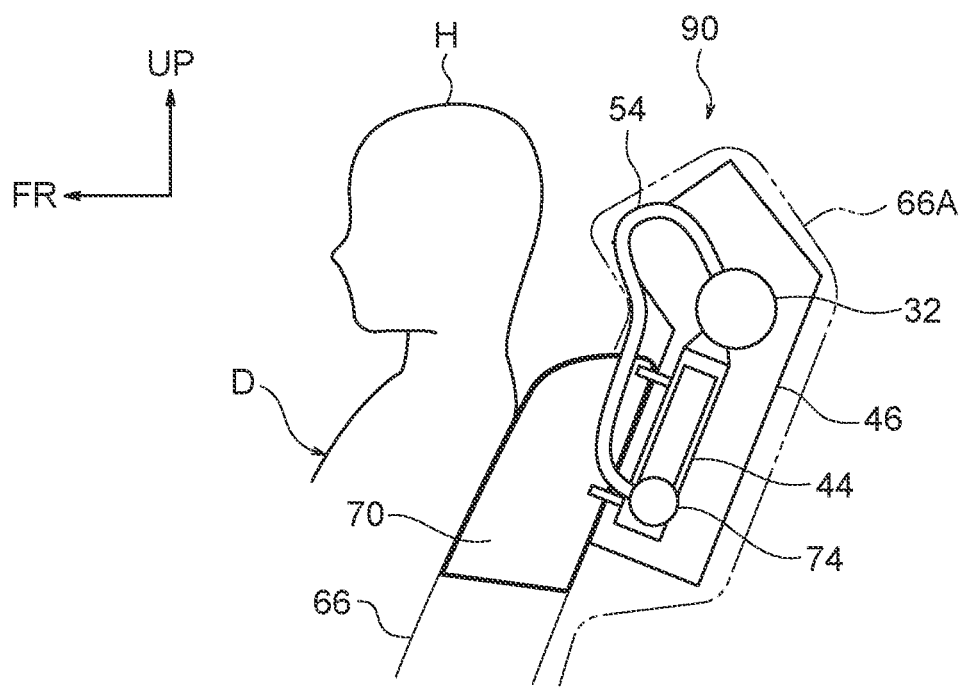
FIG. 27 is a side sectional view of main portions illustrating a state before inflation and deployment of the airbag, in a passenger protecting device relating to a fourth embodiment.
Figure 28:
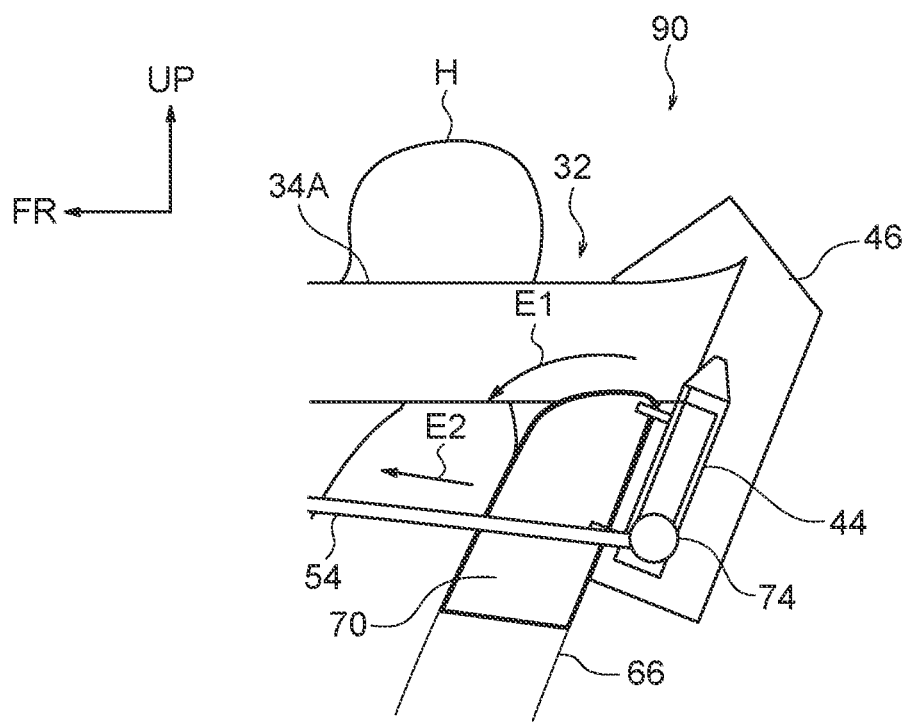
FIG. 28 is a side sectional view of main portions illustrating a state immediately after completion of inflation and deployment of the airbag, in the passenger protecting device relating to the fourth embodiment.
Figure 29:
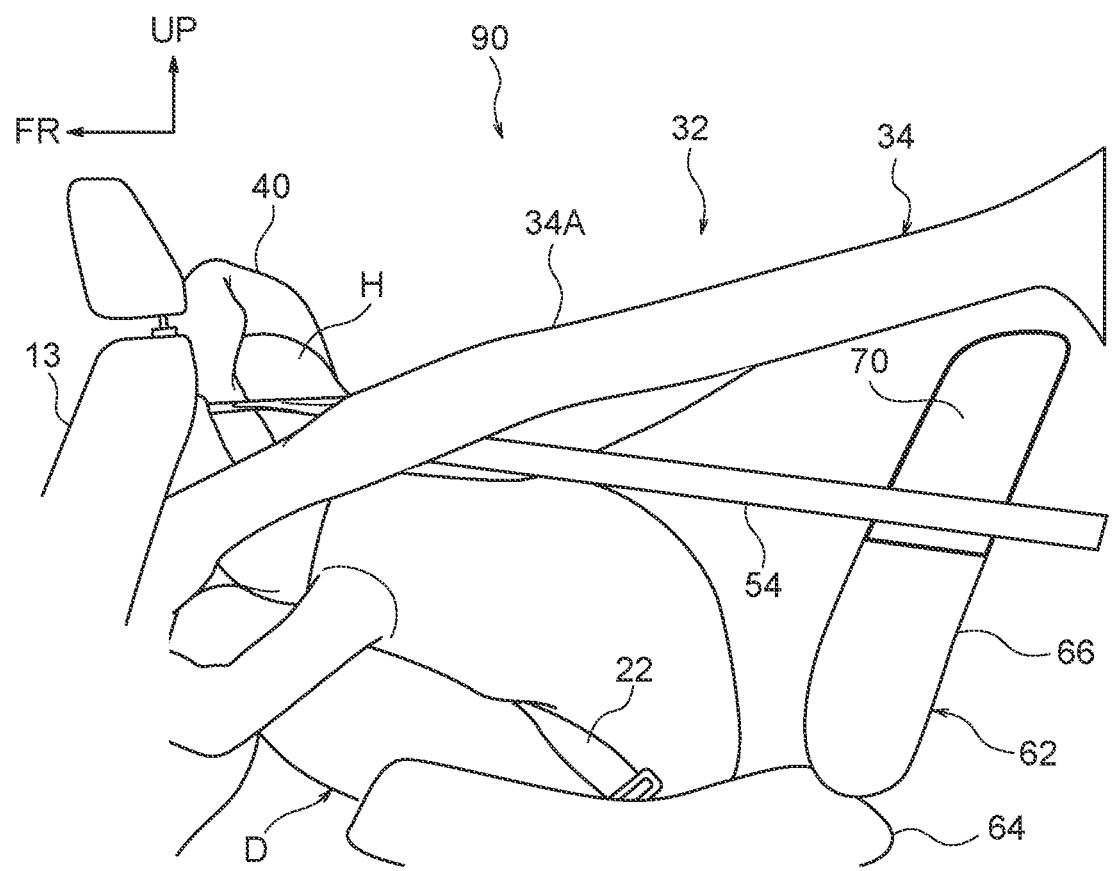
FIG. 29 is a side sectional view illustrating a state in the latter stage of passenger restraining by the airbag, in the passenger protecting device relating to the fourth embodiment.
Figure 30:
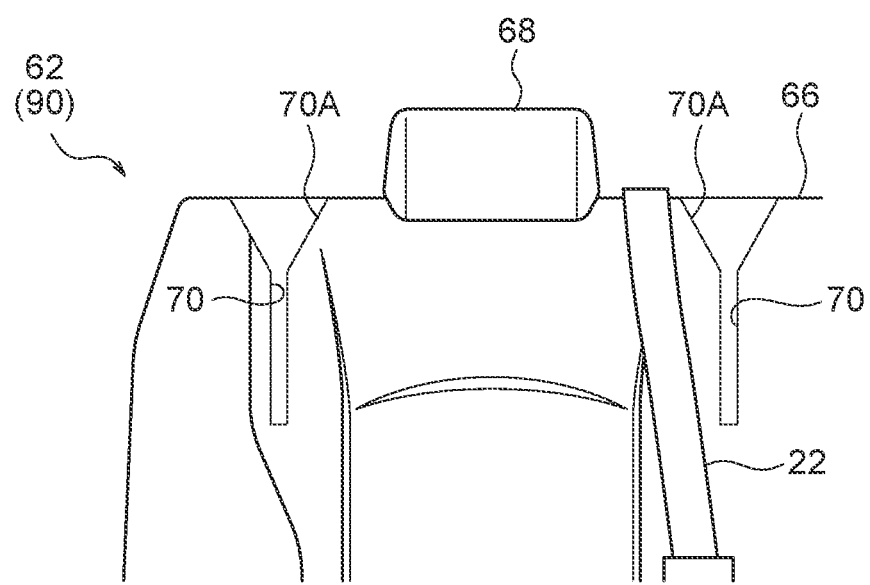
FIG. 30 is a front view illustrating a portion of the vehicle seat at which the passenger protecting device relating to the fourth embodiment is provided.

Main portions in a state before inflation and deployment of the airbag 32 in a passenger protecting device 90 relating to a fourth embodiment of the present disclosure are illustrated in a side view in FIG. 27. Main portions in a state immediately after completion of inflation and deployment of the airbag 32 in the passenger protecting device 90 relating to the fourth embodiment are illustrated in a side view in FIG. 28. A state in the latter stage of passenger restraining by the airbag 32 in the passenger protecting device 90 relating to the fourth embodiment is illustrated in a side view in FIG. 29. A portion of the bench seat 62, which serves as a vehicle seat and at which the passenger protecting device 90 relating to the fourth embodiment is provided, is illustrated in a front view in FIG. 30.

This embodiment has a structure that is similar to that of the second embodiment. In this embodiment, the pair of wound-along portions 72 are omitted, and instead, broad portions 70A (refer to FIG. 30; reference numeral omitted in FIG. 27 through FIG. 29) are respectively provided at the upper end portions of the pair of slits 70. At the broad portions 70A, the width dimensions of the respective slits 70 in the left-right direction become wider the further toward the upper side. At the time of inflation and deployment of the airbag 32, portions of the respective rear tethers 54 pass through the broad portions 70A and are inserted in the respective slits 70. In this embodiment as well, effects that are basically similar to those of the second embodiment are obtained.

Fifth Embodiment

Figure 31:
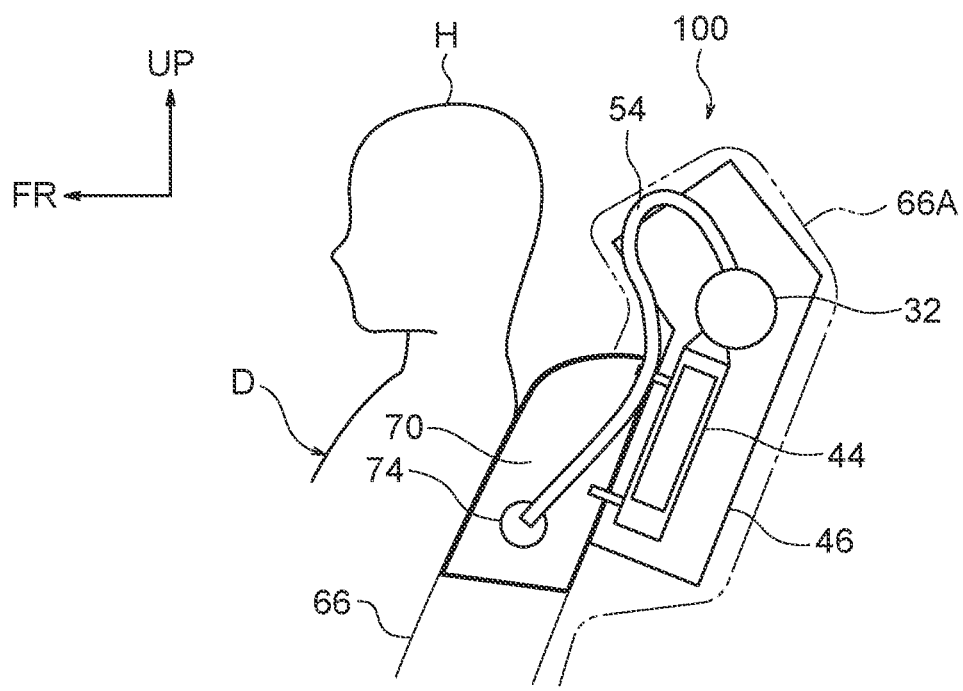
FIG. 31 is a side sectional view of main portions illustrating a state before inflation and deployment of the airbag, in a passenger protecting device relating to a fifth embodiment.
Figure 32:
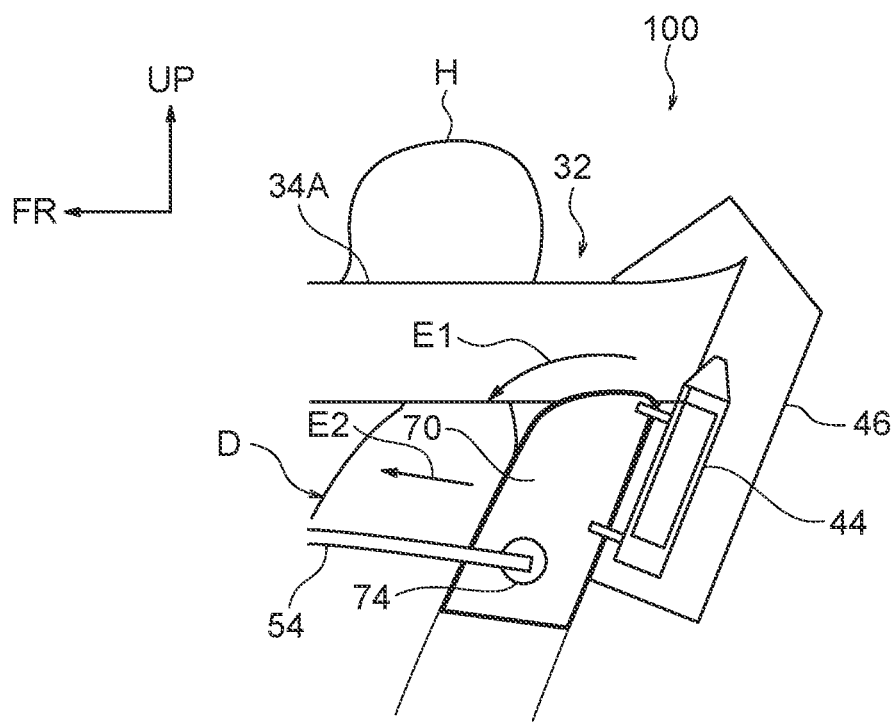
FIG. 32 is a side sectional view of main portions illustrating a state immediately after completion of inflation and deployment of the airbag, in the passenger protecting device relating to the fifth embodiment.
Figure 33:
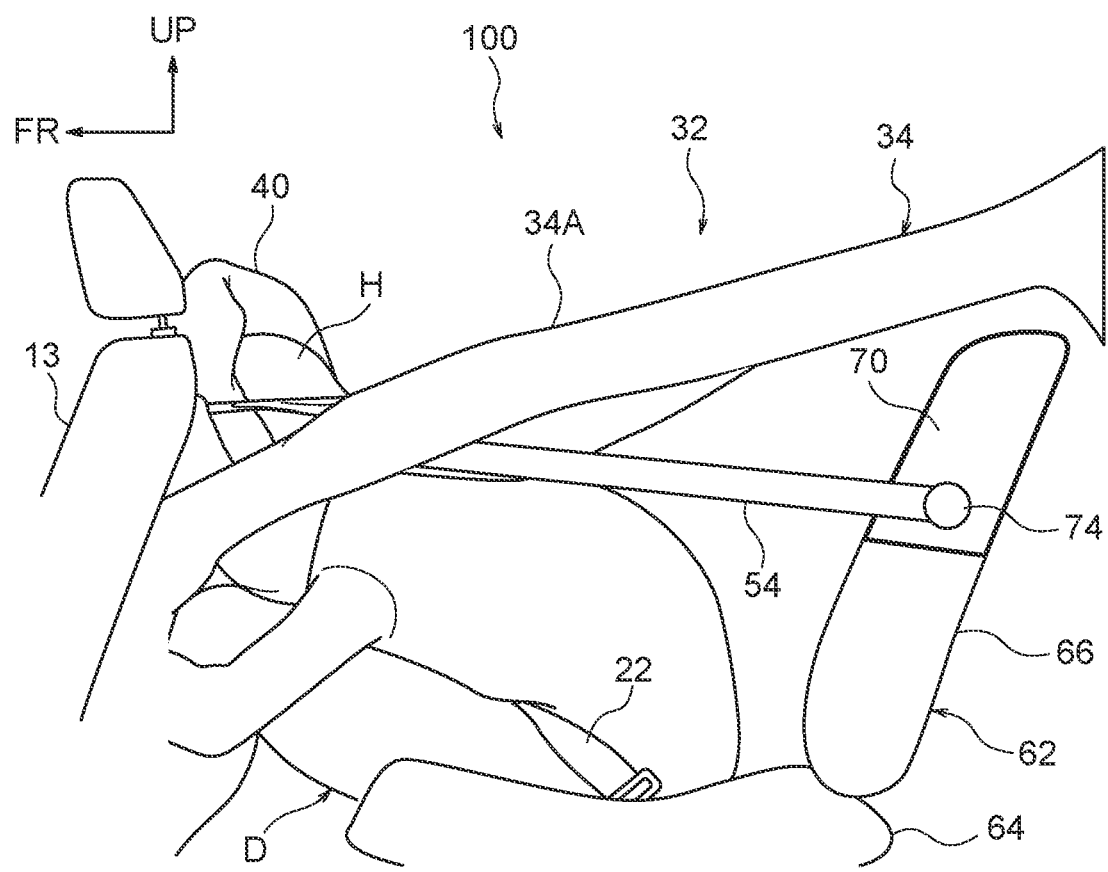
FIG. 33 is a side sectional view illustrating a state in the latter stage of passenger restraining by the airbag, in the passenger protecting device relating to the fifth embodiment.
Figure 34:
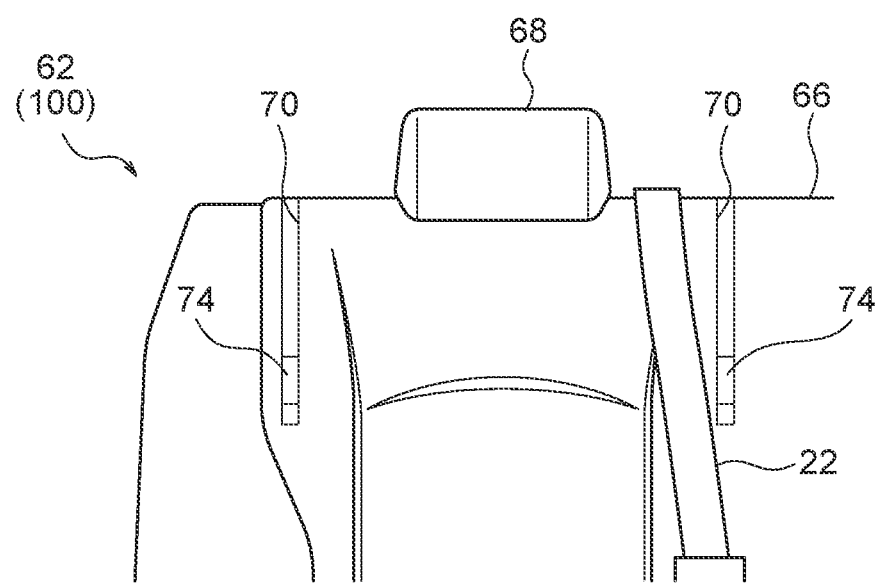
FIG. 34 is a front view illustrating a portion of the vehicle seat at which the passenger protecting device relating to the fifth embodiment is provided.

Main portions in a state before inflation and deployment of the airbag 32 in a passenger protecting device 100 relating to a fifth embodiment of the present disclosure are illustrated in a side view in FIG. 31. Main portions in a state immediately after completion of inflation and deployment of the airbag 32 in the passenger protecting device 100 relating to the fifth embodiment are illustrated in a side view in FIG. 32. A state in the latter stage of passenger restraining by the airbag 32 in the passenger protecting device 100 relating to the fifth embodiment is illustrated in a side view in FIG. 33. A portion of the bench seat 62, which serves as a vehicle seat and at which the passenger protecting device 100 relating to the fifth embodiment is provided, is illustrated in a front view in FIG. 34.

This embodiment has a structure that is similar to that of the second embodiment. In this embodiment, the pair of wound-along portions 72 are omitted, and instead, the fixing portions 74 are provided within the pair of slits 70, respectively. The fixing portions 74 are portions of the frame of the seatback 66. The respective other end portions of the pair of rear tethers 54 are attached to the fixing portions 74 respectively. In this embodiment as well, effects that are basically similar to those of the second embodiment are obtained.

MODIFIED EXAMPLES

Figure 35:
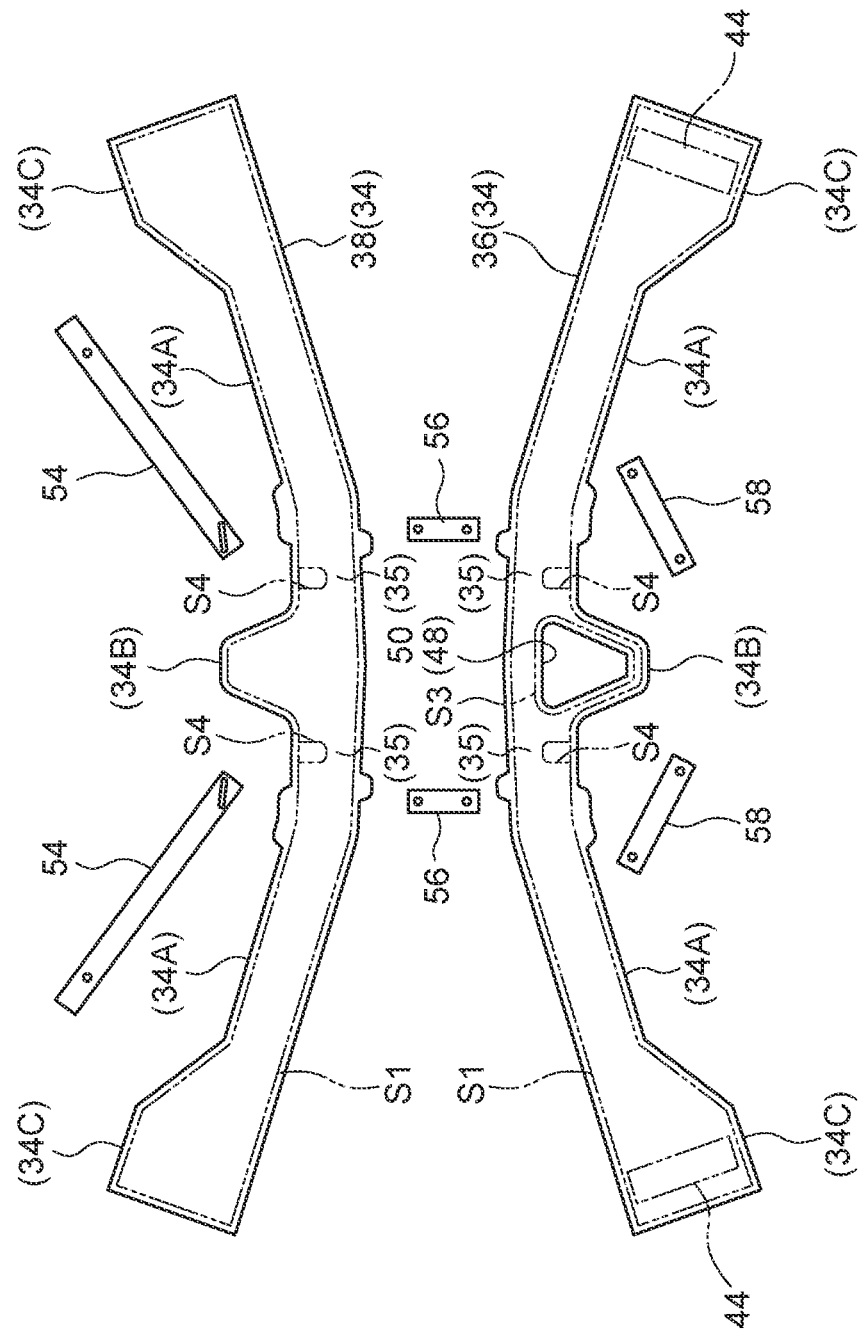
FIG. 35 is a deployed view illustrating a first modified example of the front-rear chamber.
Figure 36:
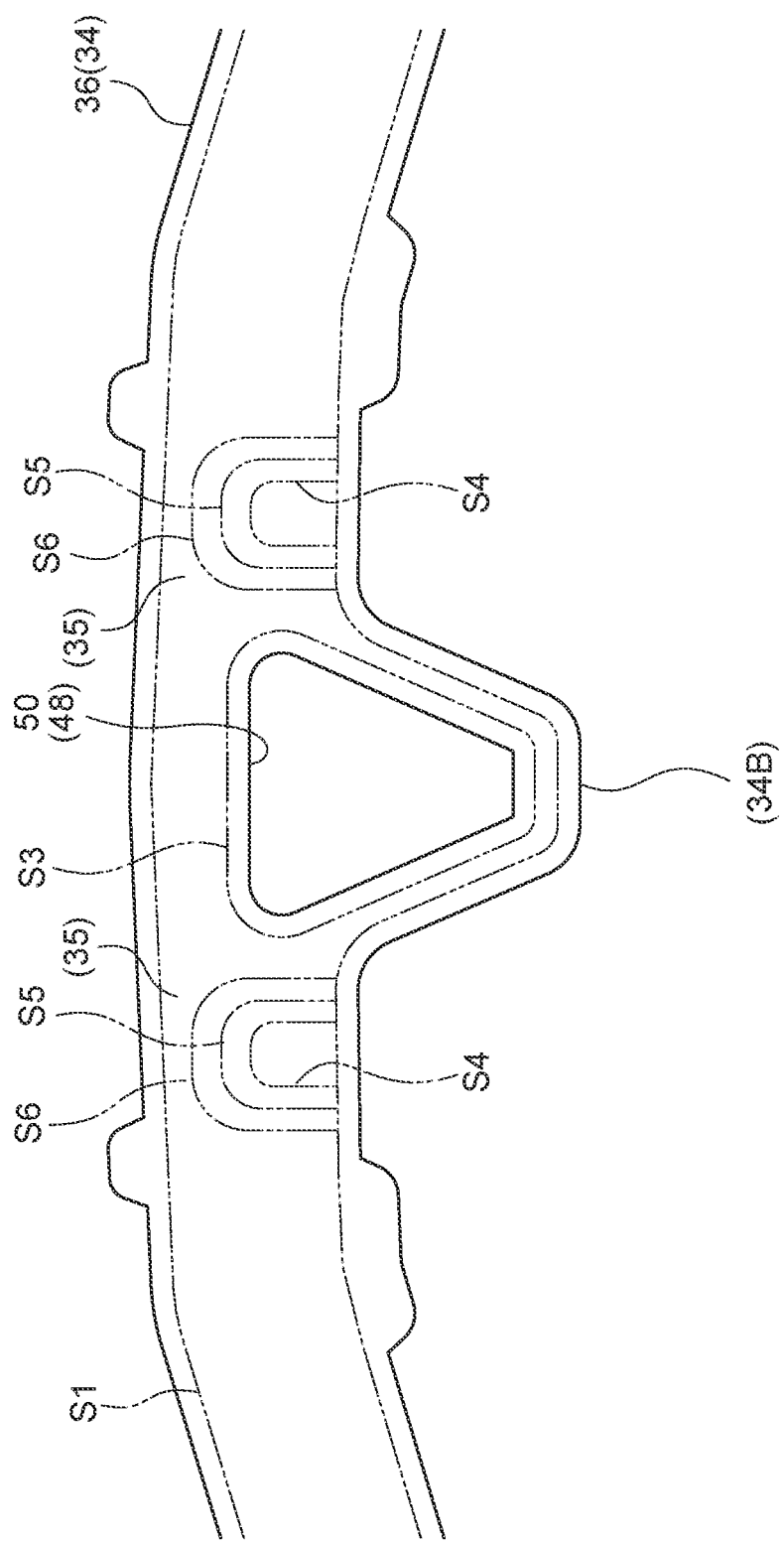
FIG. 36 is a deployed view illustrating a portion of the structure shown in FIG. 35 in an enlarged manner.
Figure 37:
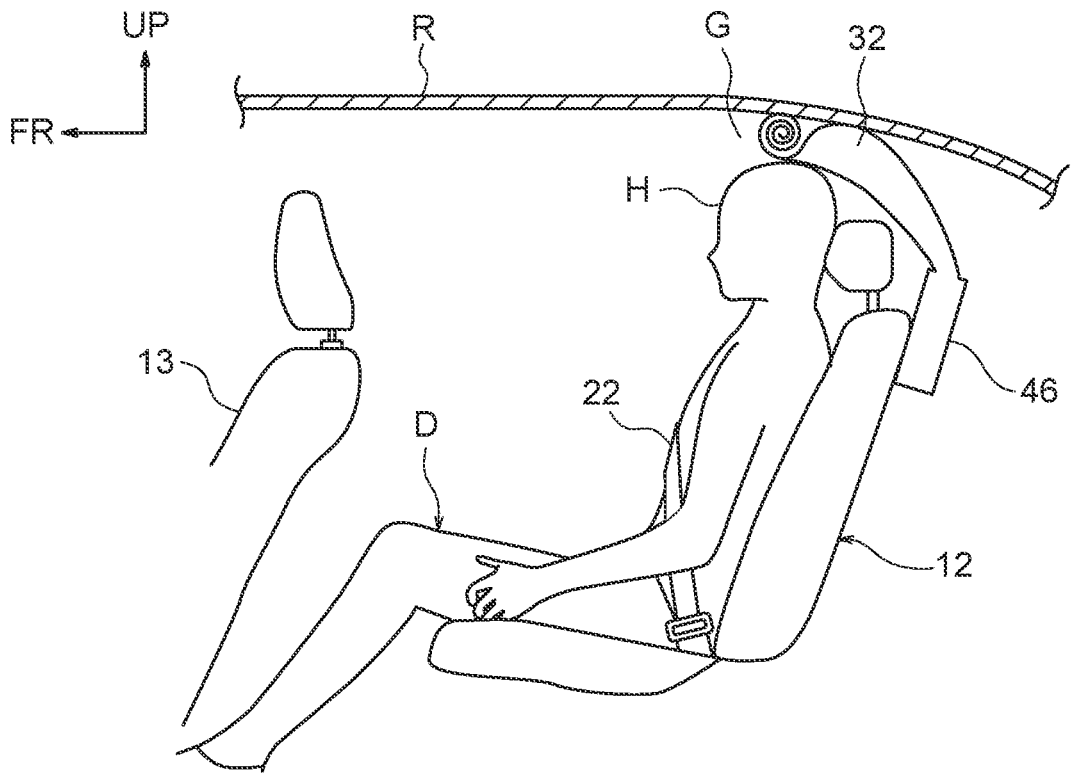
FIG. 37 is a side view illustrating a state in the midst of passage of the airbag, which is in the initial stage of inflation and deployment, through a gap between the head of the passenger and a ceiling of the vehicle.
Figure 38:
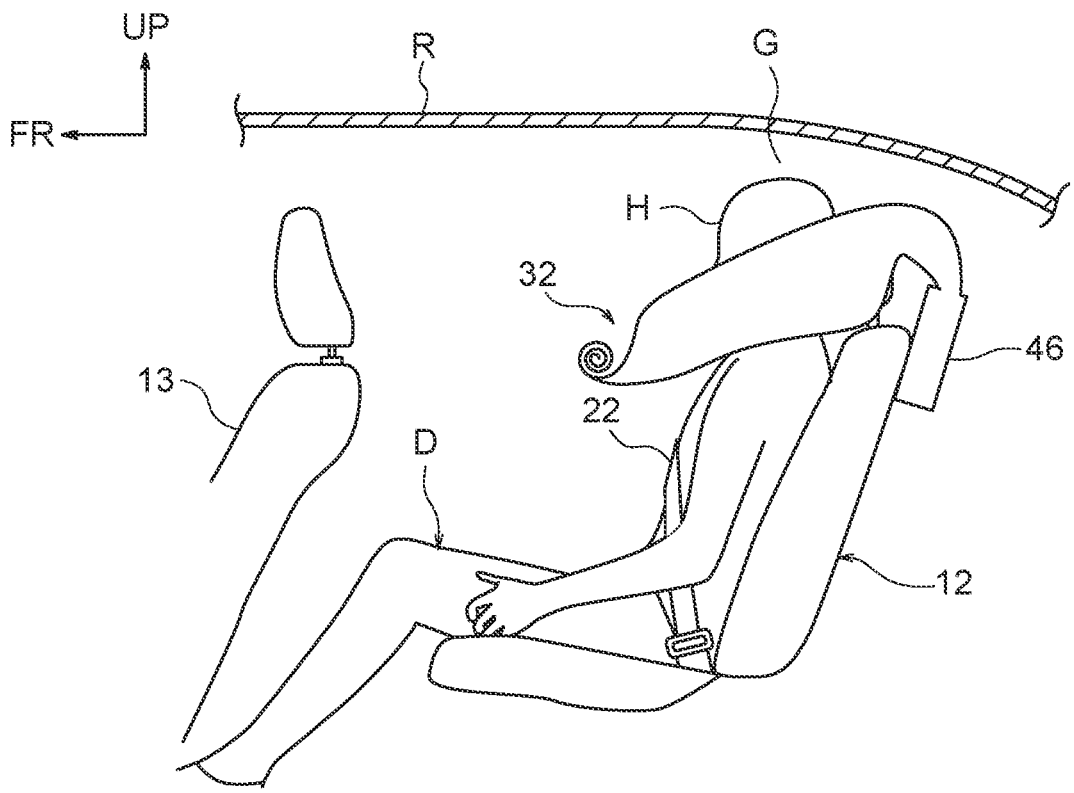
FIG. 38 is a side view corresponding to FIG. 37 and illustrating a state in an intermediate stage of inflation and deployment of the airbag.
Figure 39:
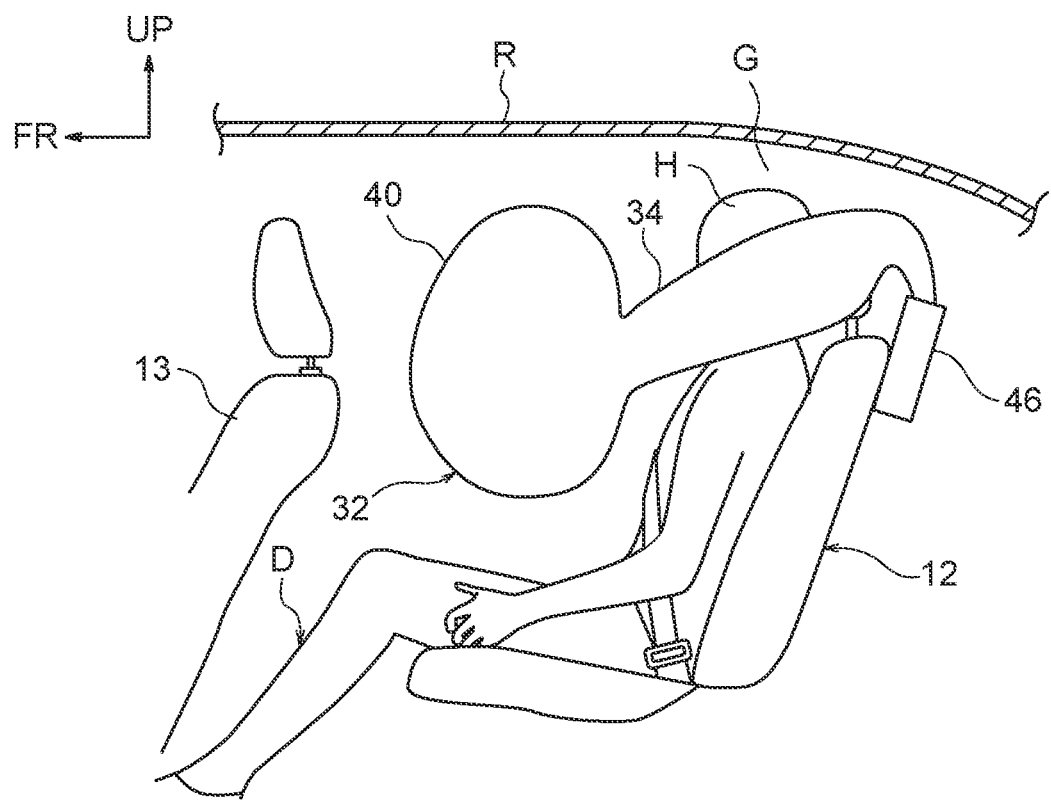
FIG. 39 is a side view corresponding to FIG. 37 and illustrating a state in which inflation and deployment of the airbag have been completed.

Modified examples of the embodiments of the present disclosure are described next. A first modified example of the front-rear chamber 34 is illustrated in a deployed view in FIG. 35. At the front-rear chamber 34 of the first modified example, a left and right pair of narrowing portions 35 are provided at the connecting portion 34B. The pair of narrowing portions 35 are disposed at the upstream side of the flow of the gas that flows within the front-rear chamber 34, with respect to the communication hole 48. The narrowing portions 35 are formed by the two base fabrics 36, 38 that structure the front-rear chamber 34 being sewn together at any of U-shaped sewn portions S4, S5, S6 illustrated in FIG. 36. The internal sectional surface area of the connecting portion 34B (i.e., the sectional surface area of the flow path of the connecting portion 34B) is reduced by the pair of narrowing portions 35. Due thereto, at the time of inflation and deployment of the airbag 32, it becomes difficult for gas to flow from the front-rear chamber 34 to the airbag main body 40, and the inflation and deployment of the airbag main body 40 can be delayed even more. As a result, as illustrated schematically in FIG. 37 through FIG. 39, it is even easier for the airbag main body 40 to pass through narrow gap G between the head H of the passenger D and ceiling R of the vehicle, and it is easy for the airbag main body to inflate after passing through the aforementioned gap G. Note that there may be a structure in which the sewn portions S5 or the sewn portions S6 that are illustrated in FIG. 36 are provided instead of the sewn portions S4. Due thereto, the internal sectional surface area of the pair of narrowing portions 35 can be adjusted.

Figure 40:
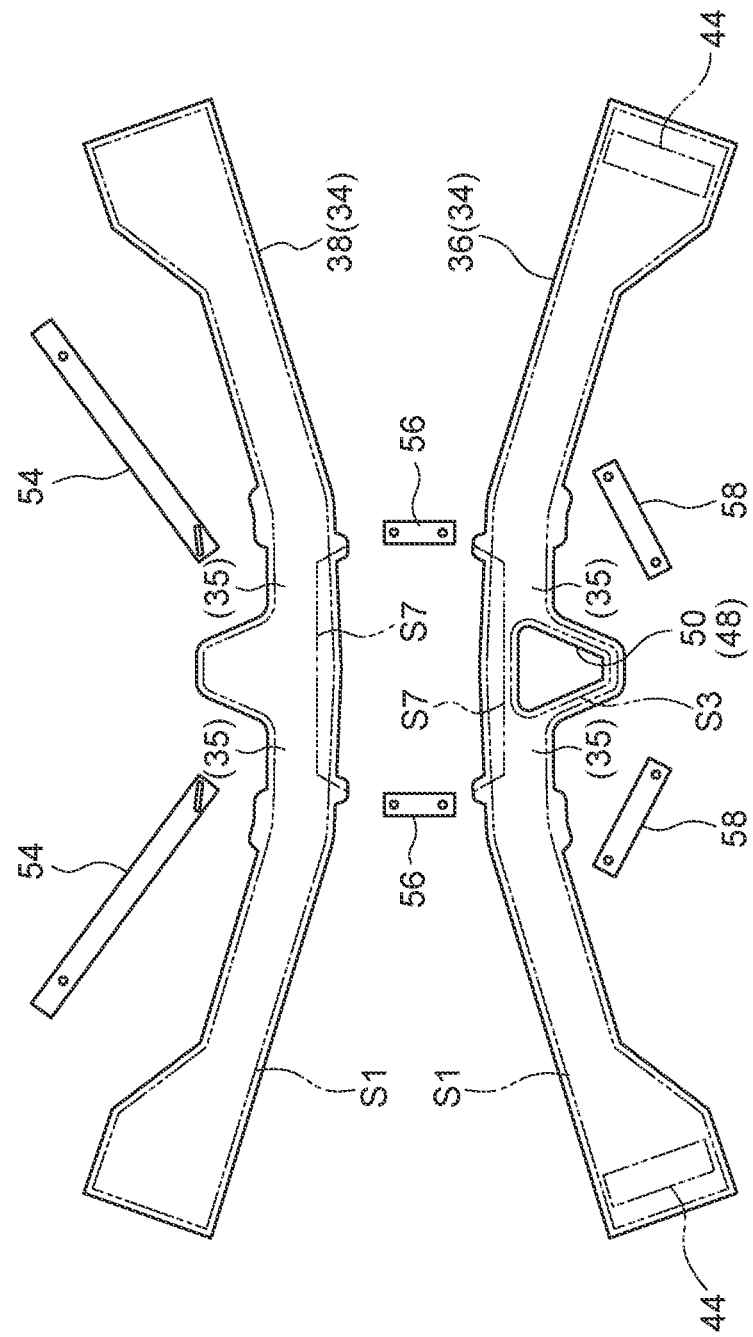
FIG. 40 is a deployed view illustrating a second modified example of the front-rear chamber.
Figure 41:
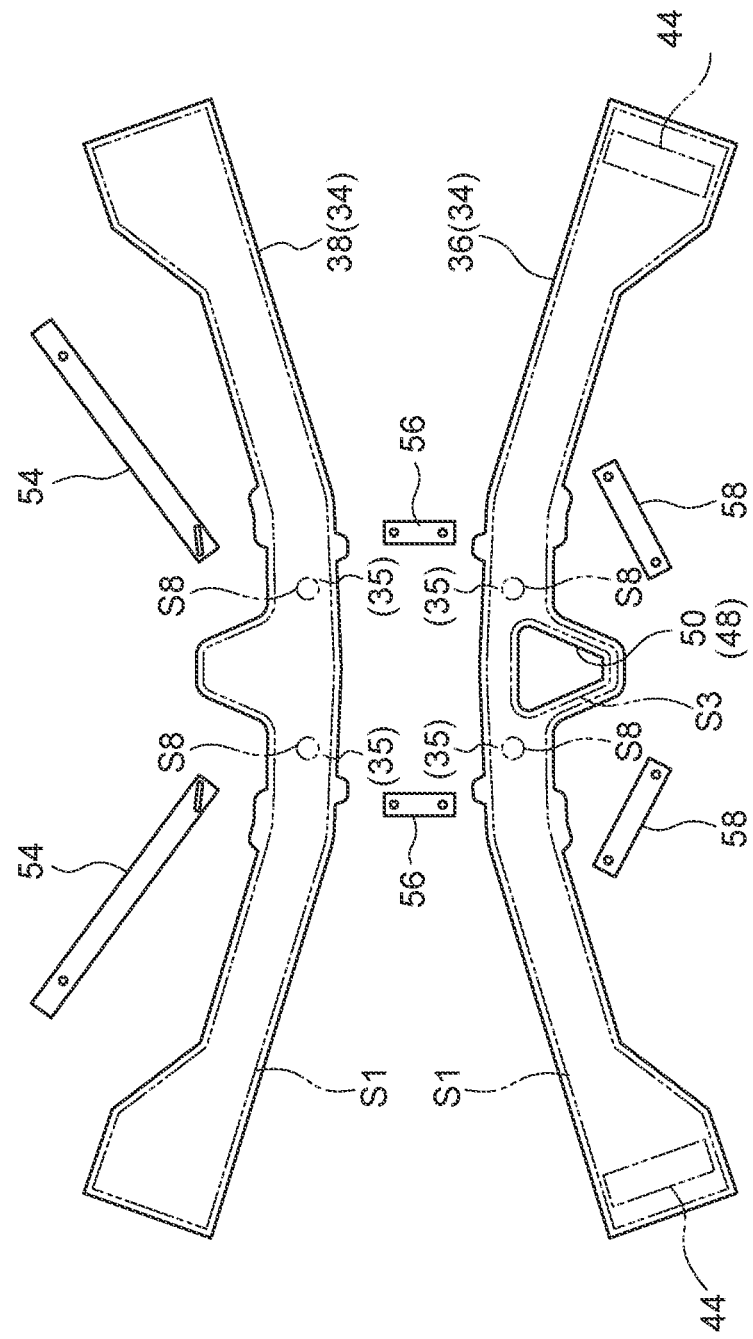
FIG. 41 is a deployed view illustrating a third modified example of the front-rear chamber.

A second modified example of the front-rear chamber 34 is illustrated in FIG. 40. In this second modified example, the pair of narrowing portions 35 are formed by the two base fabrics 36, 38 that structure the front-rear chamber 34 being sewn together at sewn portion S7 that is elongated and is shown in FIG. 40. A third modified example of the front-rear chamber 34 is illustrated in FIG. 41. In this third modified example, the pair of narrowing portions 35 are formed by the two base fabrics 36, 38 that structure the front-rear chamber 34 being sewn together at two sewn portions S8 that are formed like islands and are shown in FIG. 41. Effects that are similar to those of the first modified example are obtained in the second modified example and the third modified example as well.

Figure 42:
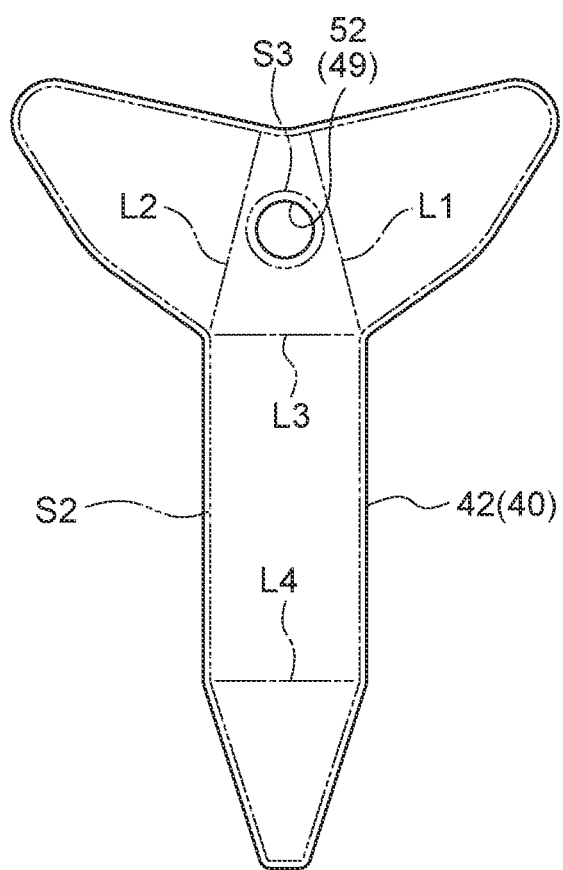
FIG. 42 is a deployed view illustrating an example in which a communication hole of a small diameter is formed in the airbag main body.

An example in which a communication hole 49 of a small diameter is formed in the airbag main body 40 is illustrated in a deployed view in FIG. 42. The opening surface area of this communication hole 49 is set to be smaller than the opening surface area of the communication hole 48 in the first embodiment. By making the diameter of the communication hole 49 small in this way, at the time of inflation and deployment of the airbag 32, it is difficult for gas to flow from the front-rear chamber 34 to the airbag main body 40, and the inflation and deployment of the airbag main body 40 can be delayed even more. As a result, it is even easier for the airbag main body 40 to pass through the aforementioned gap G (see FIG. 37 through FIG. 39). Moreover, because there is no need to add sewn portions to the front-rear chamber 34 as in the above-described first through third modified examples, an increase in the manufacturing cost can be suppressed.

Figure 43:
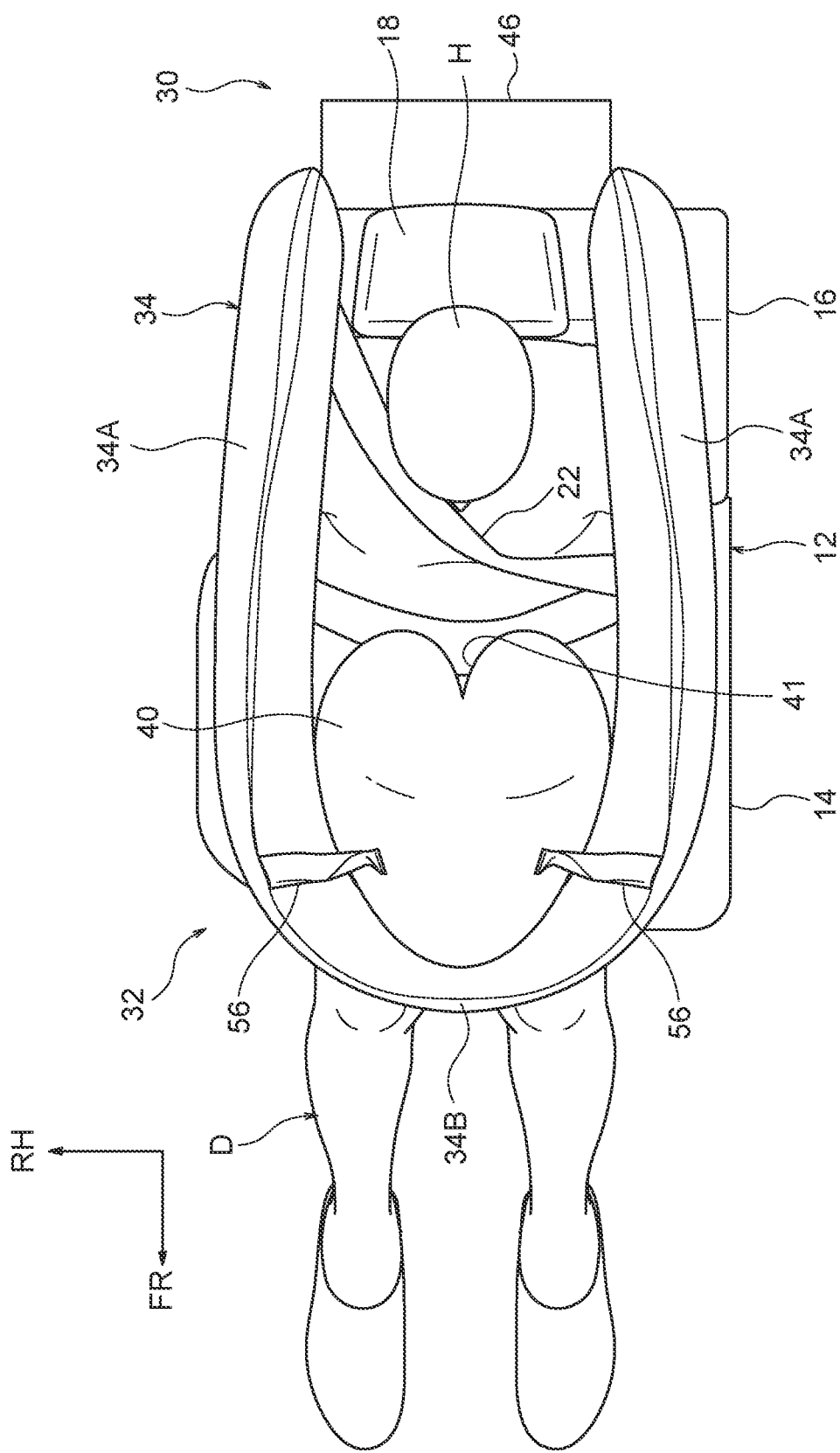
FIG. 43 is a plan view illustrating an example in which a cleft, into which the head of the passenger can enter, is formed in the airbag main body.

An example in which a cleft 41, into which the head H of the passenger D can enter, is formed in the airbag main body 40 is illustrated in a plan view in FIG. 43. This cleft 41 is formed so as to extend in the vertical direction in the left-right direction central portion of the rear side surface of the airbag main body 40 that is in the inflated and deployed state. At the time of restraining the passenger by the airbag 32, due to the head H of the passenger D entering into this cleft 41, it is easy for the head H to advance forward, and therefore, it is difficult for rearward bending of the neck of the passenger D to occur. Note that, at the airbag main body 40, the above-described cleft 41 may be formed or may not be formed at the region contacted by the chest C of the passenger D.

Although the present disclosure has been described above by exemplifying several embodiments and modified examples, the present disclosure can be implemented by being modified in various ways within a scope that does not depart from the gist thereof. The scope of the right of the present disclosure is, of course, not limited by the above-described respective embodiments and respective modified examples.

What is claimed is:
1. An airbag device, comprising:
an inflator configured to generate gas at a time of a collision of a vehicle; and
an airbag to which the gas is supplied, and that is configured to inflate and deploy from a seat rear side of an upper portion of a vehicle seat toward a seat front side, wherein the airbag has:
a front-rear chamber having a pair of left and right front-rear extending portions formed in elongated tube shapes that are configured to pass by respective left and right sides of a head of a passenger seated in the vehicle seat and inflate and deploy toward the seat front side and diagonally downward, and a connecting portion connecting front end portions of the pair of front-rear extending portions in a seat left-right direction; and
an airbag main body that inflates and deploys toward a side of the passenger at a seat rear side of the connecting portion later than the front-rear chamber, and that, at a time when the passenger is restrained, is compressed in a seat front-rear direction while stretching the front-rear chamber in the seat front-rear direction,
wherein gas from the inflator is supplied to the airbag main body via a communication hole positioned at seat rear side of a seat left-right direction central portion of the connecting portion in an inflated and deployed state of the front-rear chamber, and
wherein the connecting portion is sewn to the airbag main body at a sewn portion provided at the central portion of the connecting portion, and the communication hole that connects the connecting portion and the airbag main body is formed at an inner side of the sewn portion.

2. The airbag device of claim 1, wherein a base fabric that structures the front-rear chamber includes a base fabric that is harder to stretch than a base fabric that structures the airbag main body.

3. The airbag device of claim 2, wherein the front-rear chamber is a structure in which a plurality of base fabrics are superposed and sewn together, and one or more of the plurality of base fabrics are the base fabric that is harder to stretch.

4. A passenger protection device, comprising:
a vehicle seat in which a passenger sits; and
the airbag device of claim 3, which is installed at a seat rear side of an upper portion of the vehicle seat.

5. A passenger protection device, comprising:
a vehicle seat in which a passenger sits; and
the airbag device of claim 2, which is installed at a seat rear side of an upper portion of the vehicle seat.

6. The airbag device of claim 1, wherein a shape of the airbag main body is configured such that the airbag main body is sandwiched between thighs and chest of the passenger at a time of restraining.

7. A passenger protection device, comprising:
a vehicle seat in which a passenger sits; and
the airbag device of claim 6, which is installed at a seat rear side of an upper portion of the vehicle seat.

8. The airbag device of claim 1, comprising a left and right pair of rear tethers having respective one end portions that are attached to the pair of front-rear extending portions, and having respective other end portions that are attached to a seatback of the vehicle seat or to a vehicle body further toward a seat rear side than the passenger, and that, at a time of restraining, pull the pair of front-rear extending portions in toward seat obliquely rearward and downward sides.

9. The airbag device of claim 8, wherein lower surfaces of the pair of front-rear extending portions are structured so as to abut left and right shoulders of the passenger at a time of restraining.

10. A passenger protection device, comprising:
a vehicle seat in which a passenger sits; and
the airbag device of claim 9, which is installed at a seat rear side of an upper portion of the vehicle seat.

11. The airbag device of claim 8, wherein:
the vehicle seat is a bench seat,
a left and right pair of slits, which extend in a seat vertical direction at respective seat left-right direction sides of the passenger, are formed in a seatback of the bench seat, and
in a state before inflation and deployment of the airbag, portions of the respective rear tethers are inserted through the respective slits.

12. The airbag device of claim 8, wherein:
the vehicle seat is a bench seat,
a left and right pair of slits, which extend in a seat vertical direction at respective seat left-right direction sides of the passenger, are formed in a seatback of the bench seat,
upper end portions of the respective slits are broad portions at which width dimensions of the slits widen toward a seat upper side, and
at a time of inflation and deployment of the airbag, portions of the respective rear tethers pass through the respective broad portions and are inserted within the respective slits.

13. The airbag device of claim 8, wherein:
the vehicle seat is a bench seat,
a left and right pair of slits, which extend in a seat vertical direction at respective seat left-right direction sides of the passenger, are formed in a seatback of the bench seat, and
respective other end portions of the rear tethers are fixed to a frame of the seatback within the respective slits.

14. A passenger protection device, comprising:
a vehicle seat in which a passenger sits; and
the airbag device of claim 8, which is installed at a seat rear side of an upper portion of the vehicle seat.

15. The airbag device of claim 1, comprising a left and right pair of front upper tethers respectively connecting the pair of front-rear extending portions of the front-rear chamber and upper portions, which inflate and deploy further toward a seat upper side than the front-rear chamber, of the airbag main body.

16. The airbag device of claim 1, comprising a left and right pair of front lower tethers respectively connecting the pair of front-rear extending portions of the front-rear chamber and lower portions, which inflate and deploy further toward a seat lower side than the front-rear chamber, of the airbag main body.

17. The airbag device of claim 1, wherein a cleft, into which a head of the passenger can enter at a time of restraining, is formed along a seat vertical direction in a seat left-right direction central portion of a seat rear side surface of the airbag main body that is in an inflated and deployed state.

18. A passenger protection device, comprising:
a vehicle seat in which a passenger sits; and
the airbag device of claim 1, which is installed at a seat rear side of an upper portion of the vehicle seat.

19. The airbag device of claim 1, wherein the front-rear chamber is a structure in which two base fabrics are superposed, and peripheral edge portions thereof are sewn together, and a base fabric that is harder to stretch than a base fabric of the airbag main body is disposed between the two base fabrics.

20. An airbag device, comprising:
- an inflator configured to generate gas at a time of a collision of a vehicle; and
- an airbag to which the gas is supplied, and that is configured to inflate and deploy from a seat rear side of an upper portion of a vehicle seat toward a seat front side, wherein the airbag has:
- a front-rear chamber having a left and right pair of front-rear extending portions that are configured to pass by respective left and right sides of a head of a passenger seated in the vehicle seat and inflate and deploy toward the seat front side, and a connecting portion connecting front end portions of the pair of front-rear extending portions in a seat left-right direction; and
- an airbag main body that inflates and deploys toward a side of the passenger at a seat rear side of the connecting portion later than the front-rear chamber, and that, at a time when the passenger is restrained, is compressed in a seat front-rear direction while stretching the front-rear chamber in the seat front-rear direction, wherein a base fabric that structures the front-rear chamber includes a base fabric that is harder to stretch than a base fabric that structures the airbag main body.

* * * * *